United States Patent
Tränk et al.

(10) Patent No.: US 11,184,940 B2
(45) Date of Patent: Nov. 23, 2021

(54) MITIGATION OF SHORTAGE OF UNICAST BEARERS IN A WIRELESS COMMUNICATION SYSTEM

(71) Applicant: Telefonaktiebolaget LM Ericsson (publ), Stockholm (SE)

(72) Inventors: Magnus Tränk, Lerum (SE); Joakim Åkesson, Landvetter (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

(21) Appl. No.: 16/612,794

(22) PCT Filed: Jun. 12, 2017

(86) PCT No.: PCT/EP2017/064319
§ 371 (c)(1),
(2) Date: Nov. 12, 2019

(87) PCT Pub. No.: WO2018/228668
PCT Pub. Date: Dec. 20, 2018

(65) Prior Publication Data
US 2020/0359444 A1    Nov. 12, 2020

(51) Int. Cl.
*H04W 76/22* (2018.01)
*H04W 76/15* (2018.01)
(Continued)

(52) U.S. Cl.
CPC .......... *H04W 76/22* (2018.02); *H04W 4/06* (2013.01); *H04W 76/15* (2018.02); *H04L 12/189* (2013.01)

(58) Field of Classification Search
CPC ....... H04W 76/22; H04W 76/15; H04W 4/06; H04L 12/189
See application file for complete search history.

(56) References Cited

U.S. PATENT DOCUMENTS

2014/0286222 A1* 9/2014 Yu .......................... H04L 12/185
                                                                370/312
2019/0028887 A1* 1/2019 Ryu ...................... H04W 48/06

FOREIGN PATENT DOCUMENTS

WO    2014137136 A1    9/2014
WO    2015144251 A1    10/2015

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.1.0, Dec. 1, 2016, pp. 1-654, 3GPP.

(Continued)

*Primary Examiner* — Will W Lin
(74) *Attorney, Agent, or Firm* — Coats & Bennett, PLLC

(57) ABSTRACT

The disclosure relates to methods at a wireless communication system, a wireless communication device, a network communication node, and a control node, respectively, for bearer control in a wireless communication system (100). Specifically, the method comprises determining (S11), by the WCD or the network communication node, whether the number of radio bearers concurrently active for the WCD is at least one of equal to a threshold value and above the threshold value. If the threshold is reached, then the WCD or the network communication node transmits (S12), towards the control node (300), a first status message indicative of that the number of radio bearers concurrent active has reached the threshold value. The first status message is received by the control node and in response to the reception (S21) of the message the control node determines (S22), based on the first status message, whether an MBMS bearer is to be activated. Further, when it is determined (S22) that the MBMS bearer is to be activated, the (Continued)

control node activates (S23) the MBMS bearer. Corresponding computer programs, computer program products, arrangements, and devices are also disclosed.

18 Claims, 11 Drawing Sheets

(51) Int. Cl.
*H04W 4/06* (2009.01)
*H04L 12/18* (2006.01)

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.1.0, Dec. 1, 2016, pp. 1-317, 3GPP.

3rd Generation Partnership Project, "3rd Generation Partnership Project; Technical Specification Group Services and System Aspects; General Packet Radio Service (GPRS) Enhancements For Evolved Universal Terrestrial Radio Access Network (E-UTRAN) Access (Release 14)", Technical Specification, 3GPP TS 23.401 V14.2.0, Dec. 1, 2016, pp. 1-385, 3GPP.

3rd Generation Partnership Project, "3rd Generation Partnership Project; Technical Specification Group Services and System Aspects; Policy and Charging Control Architecture (Release 14)", Technical Specification, 3GPP TS 23.203 V14.2.0, Dec. 1, 2016, pp. 1-256, 3GPP.

3rd Generation Partnership Project, "3rd Generation Partnership Project; Technical Specification Group Services and System Aspects; Network Architecture (Release 14)", Technical Specification, 3GPP TS 23.002 V14.0.0, Sep. 1, 2016, pp. 1-113, 3GPP.

Intel et al., "Multiple DRB Capability Handling", 3GPP TSG-SA WG2 Meeting #99, Sanya, China, Aug. 29, 2016, pp. 1-7, S2-165193, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.2.2, Apr. 1, 2017, pp. 1-721, 3GPP.

3rd Generation Partnership Project, "3rd Generation Partnership Project; Technical Specification Group Services and System Aspects; Multimedia Broadcast/Multicast Service (MBMS); Architecture and Functional Description (Release 14)", Technical Specification, 3GPP TS 23.246 V14.1.0, Dec. 1, 2016, pp. 1-76, 3GPP.

* cited by examiner

MITIGATION OF SHORTAGE OF UNICAST BEARERS IN A WIRELESS COMMUNICATION SYSTEM

TECHNICAL FIELD

The disclosure relates to the field of wireless communication. More specifically it relates to methods for bearer control in a wireless communication system where the methods are executed in a control node, a network communication node, a Wireless Communication Device, WCD, and a system thereof, respectively. The disclosed subject matter further relates to corresponding computer programs, computer program products, arrangements, and devices.

BACKGROUND

Wireless communication networks provide for unicast transmission. This means that a point-to-point, or a one-to-one, contact between a wireless communication device and the network is provided. Unicast transmission may be used in various service scenarios. For example in group communication applications, where unicast transmission is always utilized in uplink communication whereas other transmissions options (e.g. multicast transmission or broadcast transmission) may be available in downlink communication as well as unicast transmission.

For example, unicast transmission in a wireless communication system may be provided by a 3rd Generation Partnership Project, 3GPP, network, furthermore a group communication control node may be connected to an Evolved Packet System, EPS; network according to 3GPP Technical Specification 23.002 version 14.0.0. The wireless communication device uses a virtual connection called Evolved Packet System, EPS, Bearer, which enables transport of the traffic flow, i.e. Service Data Flows, SDFs, according to 3GPP Technical Specification 23.203 version 14.2.0. An EPS Bearer uniquely identifies SDFs that receive a common priority and Quality of Service, QoS, treatment between a wireless communication device and a Packet Gateway, PGW. The EPS Bearer is defined in 3GPP Technical Specification 23.401 version 14.2.0 and 3GPP Technical Specification 36.300 version 14.1.0. FIG. 1 illustrates an example context, 10, for the EPS Bearer, 30, and its radio bearer, 20.

3GPP Technical Specification 36.331 version 14.1.0 states that a wireless communication device only supports a maximum of eight radio bearers associated with the EPS bearer. The radio bearers of these EPS bearers can be used in either unacknowledged mode, UM, or acknowledged mode, AM. Further, a maximum of three of the eight radio bearers can be in UM. Since the number of radio bearers, associated with the EPS bearers, is limited there are situations when the wireless communication device utilizes all available radio bearers for communication. Hence, no radio bearers associated with the EPS bearer are available to set up a new communication and there is a risk of communication failure.

The concept of radio bearers being in UM or in AM is well known to those skilled in the art and needs no further explanation as such. However, it may be noted that UM may be used for radio bearers that can tolerate some loss of information, e.g. loss of data packets or similar, while AM may be used for radio bearers that can tolerate less or no loss of information, which e.g. may require error correction by means of Automatic Repeat Request, ARQ, or Hybrid Automatic Repeat Request, HARQ, functionality or similar.

That is, there is a need to provide methods, arrangements, devices, computer programs, and computer program products that are able to optimize the usage of the available resources, specifically the radio bearers for unicast transmission, of a wireless communication network in order to reduce the risk of communication failure.

SUMMARY

In the present disclosure methods, arrangements, devices, computer programs, and computer program products are presented that provides for an optimization of the usage of different transmission modes of a wireless communication network.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

According to a first aspect the disclosure relates to a method for bearer control in a wireless communication system. The wireless communication system comprises a control node configured for control of both unicast service, using an Evolved Packet System, EPS, bearer, and Multimedia Broadcast Multicast Service, MBMS, using an MBMS bearer. The wireless communication system further comprises a network communication node, wherein both a Wireless Communication Device, WCD, associated with the network communication node, and the network communication node are configured for both unicast service, using the EPS bearer, and MBMS, using the MBMS bearer, and are cognitive regarding a number of radio bearers concurrently active for the WCD, and wherein the radio bearers are associated with the EPS bearer.

The method comprises determining, by the WCD or the network communication node, whether a number of radio bearers concurrently active for the WCD is at least one of: equal to a threshold value and above the threshold value.

Hence, it is provided for a flexible method where the knowledge of the number of unicast radio bearers concurrently active for the WCD are made available either by the WCD or the network communication node. Further flexibility is provided since the determination regarding the number of concurrently active bearers for the WCD in relation to the threshold can be performed either by the WCD or the network communication node.

The method further comprises, when it is determined that the number of radio bearers concurrently active for the WCD is at least one of: equal to the threshold value and above the threshold value, then transmitting, by the WCD or the network communication node and towards the control node, a first status message. The first status message is indicative of that the number of radio bearers concurrently active for the WCD has reached the threshold value. The method further comprises, receiving, by the control node, the first status message; and in response to the reception of the first status message determining, by the control node, based on that the number of radio bearers concurrently active for the WCD has reached the threshold value, whether an MBMS bearer is to be activated. When it is determined that the MBMS bearer is to be activated, activating the MBMS bearer by the control node.

Hence, the control node is informed of the bearer availability of the WCD. If there is a shortage of radio bears available to the WCD, the control node may utilize MBMS bearers for some services in order to avoid a risk of losing communication due to the maximum number of radio bearers for the WCD have been reached.

A second aspect relates to a method, at a wireless communication device, WCD, for bearer control in a wireless communication system. The WCD is configured for both unicast service, using an Evolved Packet System, EPS bearer, and multimedia broadcast multicast service, MBMS, using an MBMS bearer, wherein the WCD is cognitive regarding a number of radio bearers concurrently active for the WCD, and wherein the radio bearers are associated with the EPS bearer. The method comprises determining whether the number of radio bearers concurrently active for the WCD is at least one of: equal to a threshold value and above the threshold value. Further, when it is determined that the number of radio bearers concurrently active for the WCD is at least one of: equal to the threshold value and above the threshold value, then transmitting, towards a control node, a first status message indicative of that the number of radio bearers concurrently active has reached the threshold value.

Hence, it is provided a method to mitigate the risk of losing communication when the maximum number of radio bearers in a wireless communication device has been reached.

A third aspect relates to a method, at a network communication node, for bearer control in a wireless communication system. The network communication node is configured for both unicast service, using an Evolved Packet System, EPS, bearer, and multimedia broadcast multicast service, MBMS, using an MBMS bearer, wherein the network communication node is cognitive regarding a number of radio bearers concurrently active for a wireless communication device, WCD, associated with the network communication node and wherein the radio bearers are associated with the EPS bearer. The method comprises determining whether the number of radio bearers concurrently active for the WCD is at least one of: equal to a threshold value and above the threshold value. Further, when it is determined that the number of radio bearers concurrently active for the WCD is at least one of: equal to the threshold value and above the threshold value, then transmitting, to a control node, a first status message indicative of that the number of radio bearers concurrently active has reached the threshold value.

A fourth aspect relates to a method, at a control node, for bearer control in a wireless communication system. The control node is configured for control of both unicast service, using an Evolved Packet System, EPS, bearer, and multimedia broadcast multicast service, MBMS, using an MBMS bearer. The method comprises receiving, from a network communication node, a first status message indicative of that the number of radio bearers concurrently active for a Wireless Communication Device, WCD, associated with the network communication node has reached a threshold value. Moreover, at least one of the network communication node and the WCD is cognitive regarding the number of radio bearers concurrently active for the WCD and the radio bearers are associated with the EPS bearer. Furthermore, in response to the reception of the first status message, determining, based on that the number of radio bearers concurrently active for the WCD has reached the threshold value, whether an MBMS bearer is to be activated. Then, when it is determined that the MBMS bearer is to be activated, activating the MBMS bearer.

A fifth aspect relates to a computer program for bearer control in a wireless communication system. The computer program is loadable into a data processing unit comprising processing circuitry of a Wireless Communication Device, WCD. The computer program comprises program instructions which, when run by the processing circuitry, causes the WCD to execute the method according to the second aspect.

A sixth aspect relates to computer program for bearer control in a wireless communication system. The computer program is loadable into a data processing unit comprising processing circuitry of a network communication node. The computer program comprises program instructions which, when run on the processing circuitry, causes the network communication node to execute the method according to the third aspect.

A seventh aspect relates to computer program for bearer control in a wireless communication system. The computer program is loadable into a data processing unit comprising processing circuitry of a control node. The computer program comprises program instructions which, when run on the processing circuitry, causes the control node to execute the method according to the fourth aspect.

An eight aspect relates to computer program product comprising a non-transitory computer readable medium storing a computer program according to any of fifth, sixth or seventh aspects.

A ninth aspect relates to an arrangement for a wireless communication device, WCD, for bearer control in a wireless communication system. The WCD is configured for both unicast service, using an Evolved Packet System, EPS, bearer, and multimedia broadcast multicast service, MBMS, using an MBMS bearer. The WCD is further cognitive regarding a number of radio bearers concurrently active for the WCD and the radio bearers are associated with the EPS bearer. The arrangement comprises a controller configured to cause determination whether the number of radio bearers concurrently active for the WCD is at least one of: equal to a threshold value and above the threshold value. Responsive to determination that the number of radio bearers concurrently active for the WCD is at least one of: equal to the threshold value and above the threshold value, the controller is configured to cause transmission, towards a control node, of a first status message indicative of that the number of radio bearers concurrently active has reached the threshold value.

A tenth aspect relates to a wireless communication device comprising the arrangement of aspect nine.

An eleventh aspect relates to an arrangement for a network communication node, for bearer control in a wireless communication system. The network communication node is configured for both unicast service, using an Evolved Packet System, EPS, bearer, and multimedia broadcast multicast service, MBMS, using an MBMS bearer. The network communication node is further cognitive regarding a number of radio bearers concurrently active for a wireless communication device, WCD, associated with the network communication node, and the radio bearers are associated with the EPS bearer. The arrangement comprises a controller configured to cause determination whether the number of radio bearers concurrently active for the WCD is at least one of: equal to a threshold value and above the threshold value. Responsive to determination that the number of radio bearers concurrently active for the WCD is at least one of: equal to the threshold value and above the threshold value, the controller is configured to cause transmission, to a control node, of a first status message indicative of that the number of radio bearers concurrently active has reached the threshold value.

A twelfth aspect relates to a network communication node comprising the arrangement of aspect eleven.

A thirteenth aspect relates to an arrangement, for a control node, for bearer control in a wireless communication system. The control node is configured for control of both unicast service, using an Evolved Packet System, EPS, bearer, and multimedia broadcast multicast service, MBMS, using an MBMS bearer. The arrangement comprises a controller configured to cause reception, from a network communication node, of a first status message indicative of that the number of radio bearers concurrently active for a Wireless Communication Device, WCD, associated with the network communication node has reached a threshold value. Further, at least one of the network communication node and the WCD is cognitive regarding the number of radio bearers concurrently active for the WCD, and the radio bearers are associated with the EPS bearer. Responsive to the reception of the first status message, the controller is configured to cause determination, based on that the number of radio bearers concurrently active for the WCD has reached the threshold value, whether an MBMS bearer is to be activated. Responsive to determination that the MBMS bearer is to be activated, the controller is configured to cause activation of the MBMS bearer.

A fourteenth aspect relates to a control node comprising the arrangement of aspect thirteen.

Thus, there is provided herein methods, arrangements, devices, computer programs, and computer program products that facilitate optimization of the usage of different transmission modes of a wireless communication network. In some embodiments, any of the above aspects may additionally have features and/or advantages identical with or corresponding to any of the various features and/or advantages as explained above for any of the other aspects.

BRIEF DESCRIPTION OF THE DRAWINGS

The inventive concept is now described, by way of examples, with reference to the accompanying drawings, in which.

DETAILED DESCRIPTION

Figure 1:
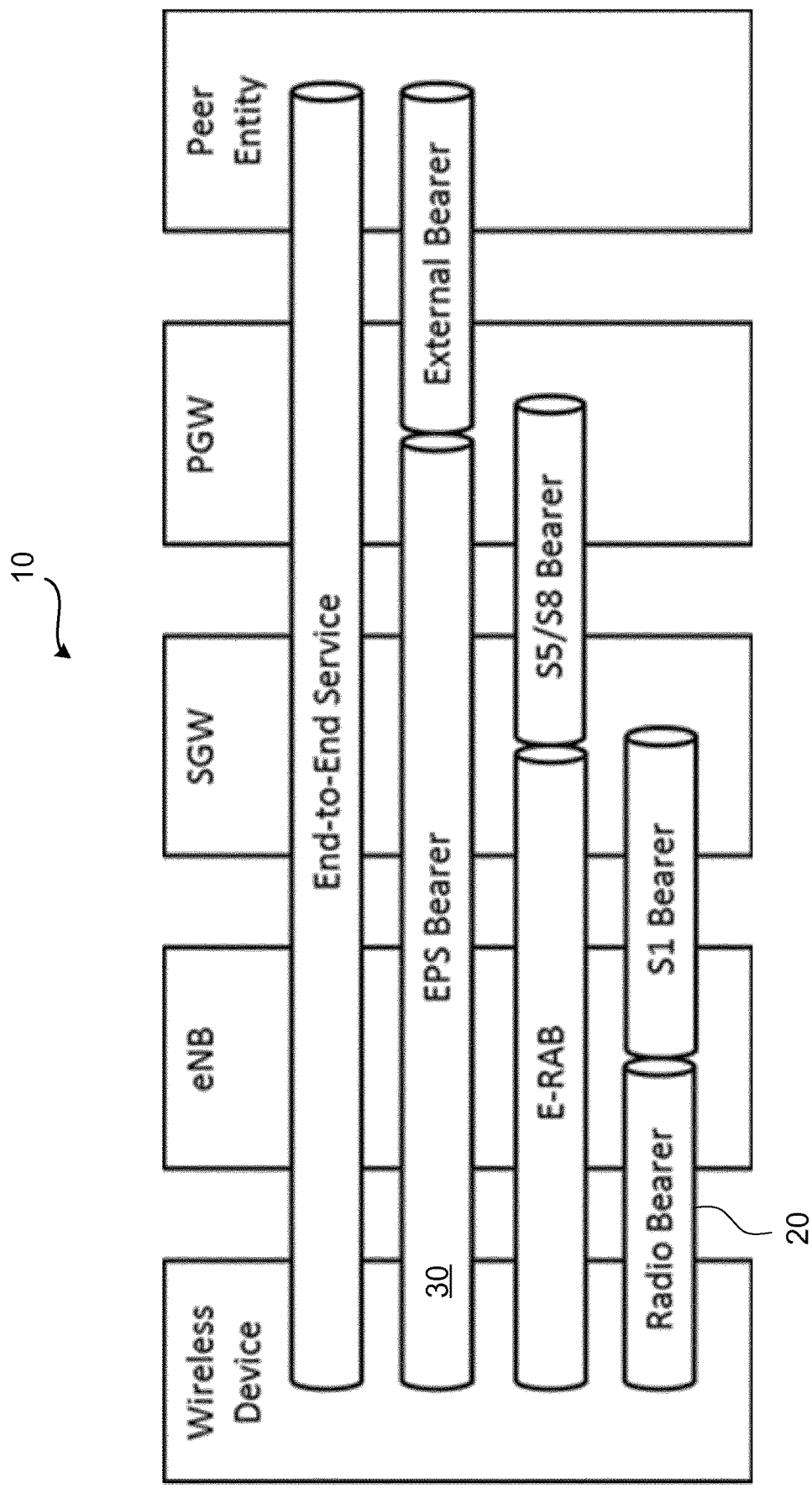
FIG. 1 is a schematic drawing of a virtual connection involving Evolved Packet System, EPS, bearers, according to the 3GPP standard.

Aspects of the present disclosure will be described more fully hereinafter with reference to the accompanying drawings. The device and method disclosed herein can, however, be realized in many different forms and should not be construed as being limited to the aspects set forth herein. Like numbers in the drawings refer to like elements throughout. Any step or feature illustrated by dashed lines should be regarded as optional.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For better understanding of the invention, the concept of group communication will be discussed in the following.

Group communication (e.g. Push to Talk or similar) requires that the same information is delivered to multiple users. These users may be located at different locations. The clients receiving the same media constitute a group of clients, which may be called a communication group. In a group communication system there is usually, but not always, only one user that is allowed to transmit data (e.g. voice or video) at a certain time—so called half duplex communication.

Two typical methods for performing group communication, i.e., a service from a single source to multiple users, are broadcast and multicast. Usually, these methods allow unidirectional point-to-multipoint transmission of multimedia data (e.g. text, audio, picture, video). However, in broadcast transmission the service is made a priori available in the broadcast service area, whether there are users in the area or not. In multicast transmission, the service is transmitted to members, e.g. wireless communication devices, WCDs, known to the network. In many radio technologies individual acknowledgement of multicast data is not utilized, hence multicast is often a unidirectional method for group communication.

Another communication alternative is unicast transmission where a user has a point-to-point, or one-to-one contact with the network. Unicast transmission is always available in group communication. This is due to the fact that unicast transmission is always used in uplink i.e. from the wireless communication device, WDC, to the group communication application server (e.g., a control node), as well as sometimes in downlink when multicast transmission is not worth the efficient for cost or performance reasons.

If many users of group communication are located within the same area, multicast or broadcast based transmission may be preferred. If users are spread out over a large area it will be more efficient to use unicast transmission for the group communication. Unicast transmission requires more resources when a service is to be distributed to multiple users. However, an advantage is that individual acknowledgement is often provided for by unicast transmission.

The 3rd Generation Partnership Project, 3GPP, technology will serve as an exemplifying technology throughout the document. However, the methods, arrangements, devices and computer program products are not limited to this technology.

Transmission of data is typically realized by utilization of different bearers. The bearer for unicast transmission in 3GPP is as previously mentioned an Evolved Packet System, EPS, bearer, as illustratively shown in FIG. 1.

As previously mentioned a wireless device only supports a maximum of eight radio bearers 20. Radio bearers mean radio bearers associated with an EPS bearer 30. These bearers are unicast radio bearers, hence radio bearers for unicast transmission. Expressed differently, the radio bearers are unicast radio bearers mapped to the EPS bearer. These terms will be used interchangeable together with the term throughout the text. Moreover, the skilled person knows when it is appropriate to interpret "EPS bearers" as "radio bearers associated with the EPS bearer".

Figure 2:
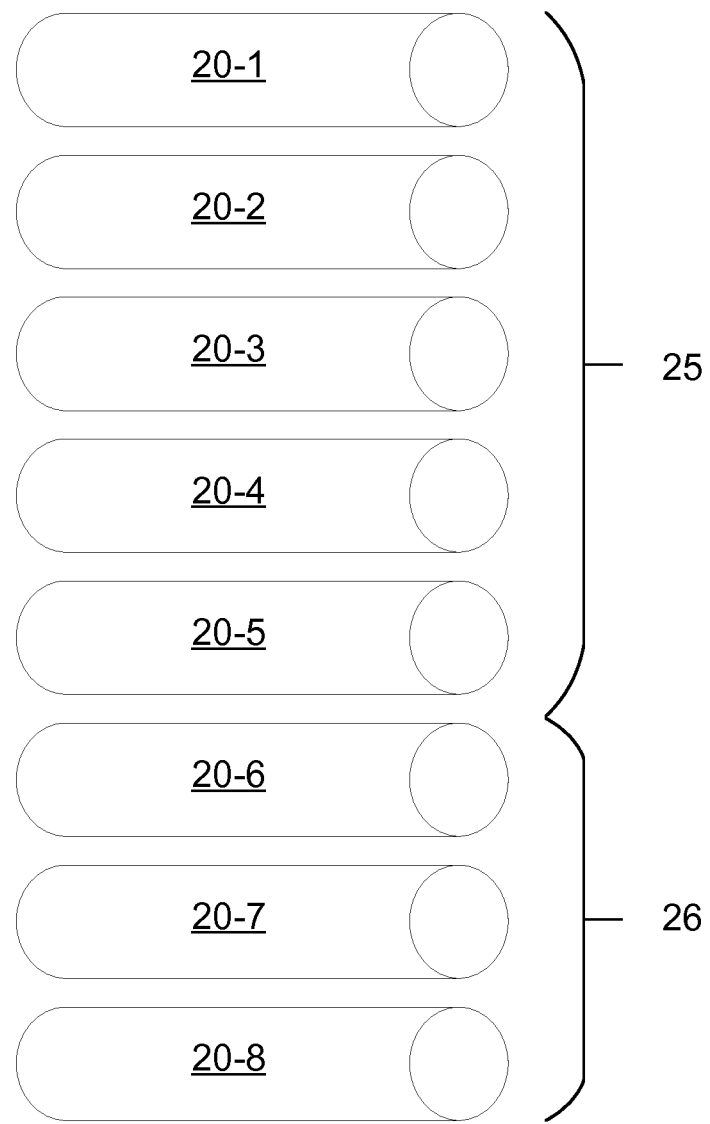
FIG. 2 is a schematic illustration of radio bearers according to some embodiments.

The radio bearers, 20-1, ..., 20-8, of the maximum eight are illustratively shown in FIG. 2. These radio bearers can be active in either unacknowledged mode, UM or acknowledged mode, AM. FIG. 2 illustrates the situation where five of the radio bearers are in AM, 25, and three of radio bearers are in UM, 26, which represents the maximum number of radio bearers in UM. UM is the preferred mode of sending real time media traffic, i.e., traffic which is delivered with low latency.

Thus, a maximum of three of the eight radio bearers can be utilized in UM. However, if six or more bearers are in AM it is not possible to set up any bearers in UM. To exemplify, if four bearers in AM are active it is possible to set up one to three bearers in UM and/or one to four bearers in AM conditioned on that only up to a total of eight bearers are possible. However, if the number of bearers in AM has reached at least six, then only additional AM bearers can be set up until the maximum number of eight is reached. Hence, no UM bearers can be activated. This is a radio interface limitation specified in 3GPP TS 36.331 v14.2.2 in a 3GPP EPS network.

Since, the number of radio bearers are limited it is not unlikely that shortage of bearer may occur.

One reason that shortage of radio bearers occur is that unicast bearers may require different Quality of Service, QoS, profiles for different connections (e.g. different group calls in group communication). This is used for example to prioritize certain connections over others, in case when there is a radio shortage in the radio network.

Priority is an attribute which is defined per EPS bearer. The priority is associated with the bearer level parameter Allocation and Retention Priority, ARP, according to 3GPP Technical Specification 23.203 version 14.2.0. The priority information of the ARP is used to give EPS bearers having higher priority preference over EPS bearers having lower priority. The priority attribute is essential for so-called mission critical, MC, services as provided by, e.g., Public Safety operators and Public Safety agencies. This is because such services often require high reliability transport. Examples of such mission critical services include police, fire and rescue communication services.

In a group communication system, it is common that a user is involved in several group calls simultaneously. These calls may have different priority level or characteristics; hence the calls require different EPS bearers. The priority function ensures that the most important (highest prioritized) communication is maintained if possible. The priority function has a similar effect for non-group communication.

If a wireless communication device is already using three EPS bearers in UM a new EPS bearers UM cannot be set up, an attempt to setup a new bearer may either fail or cause one of the existing EPS bearers to be pre-empted. However, pre-emption of existing bearers is not always possible (by regulatory requirements) or desirable if the cell has spare capacity. Furthermore, when shortage of bearers is experienced in group communication, the radio bearers that are in use may be used by other applications and are thus not known or manageable by the group communication system.

Some embodiments disclosed herein utilizes that when a shortage of radio bearers is present then a service presently utilizing one or several radio bearers may be transferred to a corresponding number of broadcast or multicast bearers, e.g. Multicast-Broadcast Multimedia Services, MBMS, in order to avoid a need to rely on the default bearer, which may not have the characteristics required to maintain a high quality service.

In 3GPP Technical Specification 23.246 v14.1.0, bearers have been defined to support broadcast transmission of MBMS. The MBMS bearers are separate from the EPS bearers. When using MBMS to broadcast media in a group communications system, a wireless communication device uses unicast to transmit the media to the group communications system, and a control node in the group communications system use broadcast to send the media to all receiving clients. Hence, there is no uplink bearer available to report lost packets and request retransmissions for the receiving clients. Due to this, the modulation and coding of the media transmission over the air must be robust enough to achieve acceptable Quality of Signal, QoS.

When Multicast-Broadcast Multimedia Service MBMS is used in a group communication system, the MBMS bearer must be activated and the users must be informed prior a group communication call setup. The MBMS resources are allocated when the MBMS bearer is started. In a 3GPP system this typically takes several seconds, while the performance requirements for a group communication call setup is typically <300 ms.

When a group communication system decides on multicast or unicast transmission there are a number of factors to consider including (but not necessarily limited to):

The number of group communication users in a cell
The number of users that are interested in a specific group call
Specific performance requirements related to the use of multicast transmission mode
The expected traffic volume The above list is not complete. Several other aspects may be considered.

Figure 3:
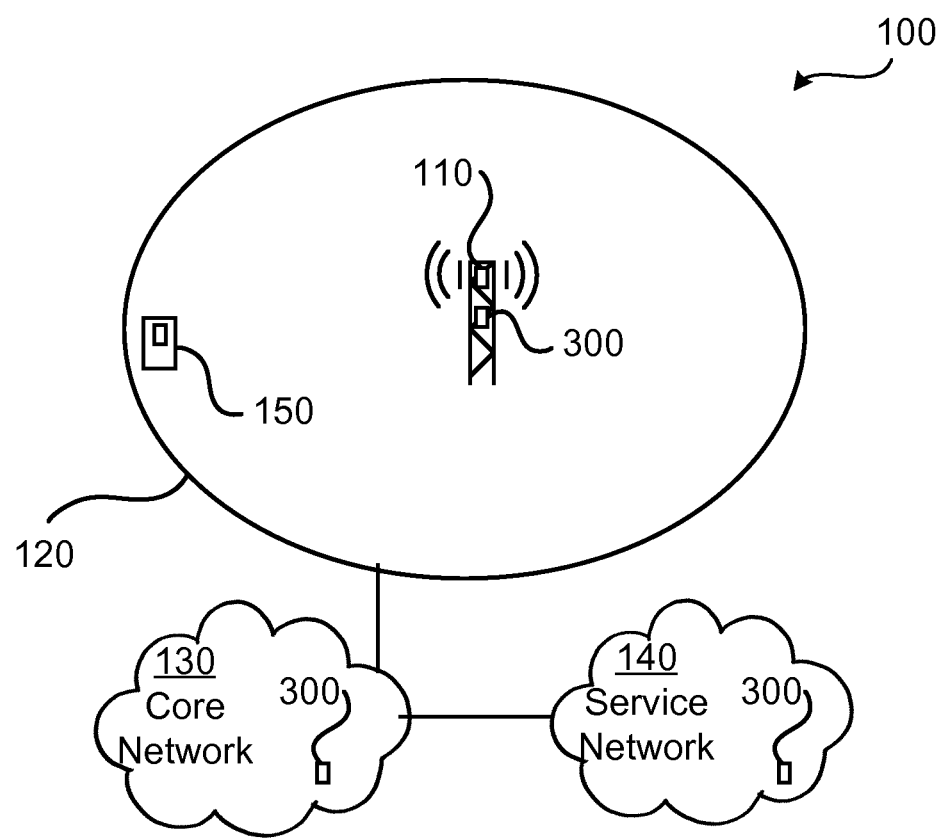
FIG. 3 is a schematic illustration of respective communication systems according to some embodiments.

FIG. 3 depicts an exemplifying radio communications system 100 in which embodiments disclosed herein may be implemented. The communications system 100 is assumed to be configured to provide services for group communication may hence be regarded as a group communications system. The group communications system 100 may be a push to talk (PTT) system.

The communications system 100 comprises at least one control node 300 and at least one wireless communication device 150. The at least one control node 300 may be provided in, or installed at the same site as, a network communication node 110 or in another entity or device in a radio access network 120, in an entity or device of a core network 130, or in an entity or device of a service network 140. In this example, the radio communications system 100 is a Long Term Evolution, LTE, system. In other examples, the radio communication system may be any Third Generation Partnership Project, 3GPP, cellular communication system, such as future communication systems also referred to as 5G. According to some aspects the control node is a mission critical, MC, service server.

Examples of wireless communication devices 150 include, but are not limited to, mobile stations, mobile phones, handsets, wireless local loop phones, mission critical, MC, service client, user equipment (UE), smartphones, laptop computers, and tablet computers. Examples of network communication nodes 110 include, but are not limited to, radio access network nodes, radio base stations, base transceiver stations, NodeBs, evolved NodeBs, eNodeB, and access points. As the skilled person understands, the communications system 100 may comprise a plurality of network communication nodes 110, each providing network access to a plurality of wireless devices 150. The herein disclosed embodiments are exemplified by a data transmission between one wireless device 150 and a control node 300. However, this should not be seen as a limitation of the claimed subject matter to any particular number of network communication node 110 or wireless communication devices 150. The embodiments disclosed herein thus relate to mechanisms for EPS bearer and Multicast-Broadcast Multimedia Services, MBMS, bearer handling in a group communications system.

The communications system described herein is assumed to provide at least services for group communication and may hence be regarded as a group communications system. The group communications system is, according to some aspects, a push to talk (PTT) system. The group communication could thus comprise a push to talk service.

The methods described herein can be executed in a group communication client node and in a group communication control node. However, the methods are not limited to this execution. The group communication system may implement the functionality of a group communication service application server, GCS AS, and be a mission critical, MC, service server, furthermore each group communication client node could be an MC service client.

Example Node Operations in a Wireless Communication Device

Figure 4:
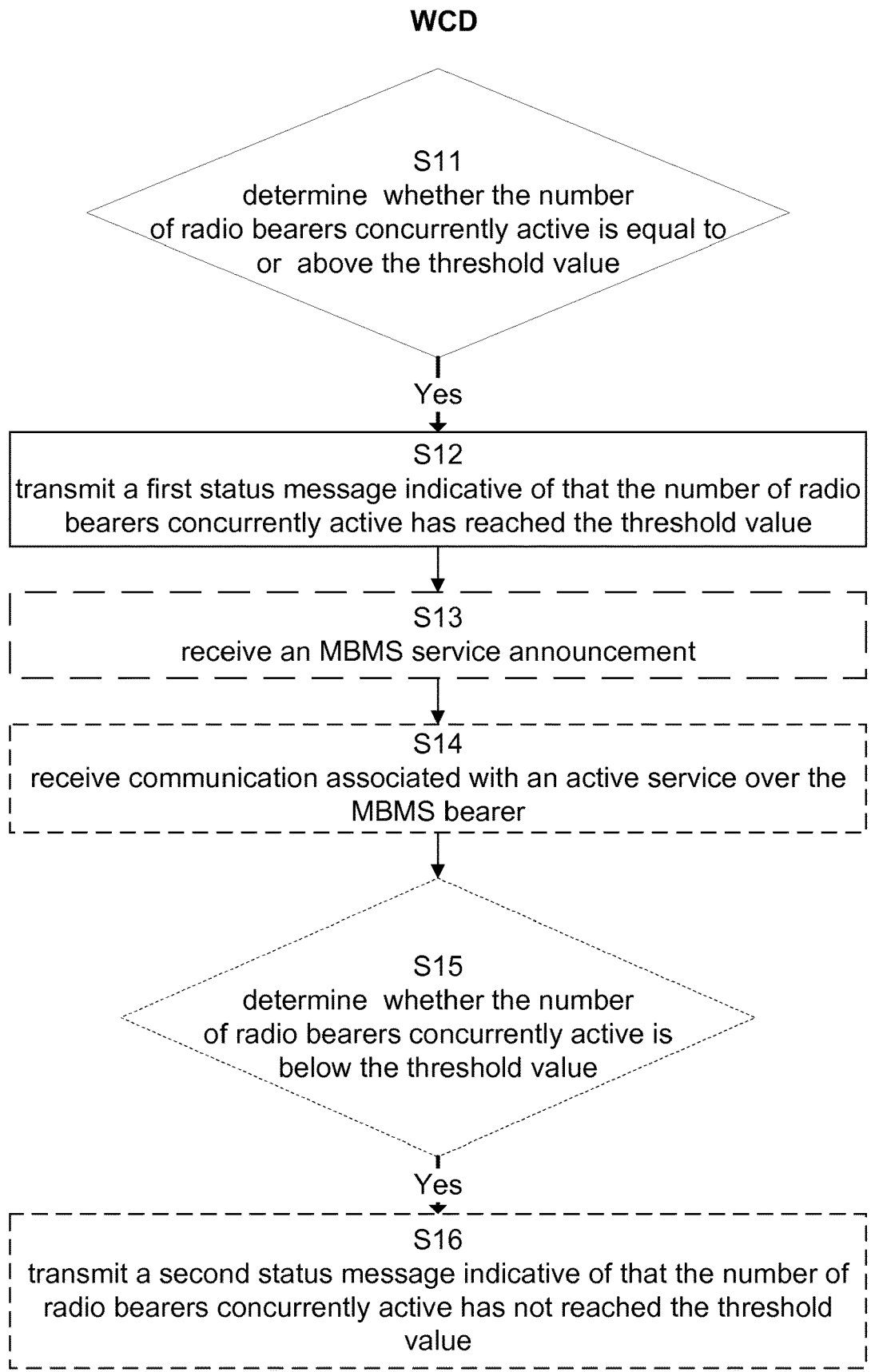
FIGS. 4, 5, 6, and 7 are flowcharts illustrating example methods according to some embodiments.

The claimed subject matter is now described in more detail referring to FIG. 4. The figure shows a flowchart of an example method, at a wireless communication device, WCD, 150, for bearer control in a wireless communication system 100, according to some aspects of the disclosed subject matter.

The WCD is configured for both unicast service, using an Evolved Packet System, EPS, bearer, and multimedia broadcast multicast service, MBMS, using an MBMS bearer. Hence, the WCD is capable to receive communication in a unicast mode and in a broadcast mode.

The WCD is further cognitive regarding a number of radio bearers concurrently active for the WCD 150 and wherein the radio bearers are associated with the EPS bearer. In other words, the information comprising the number of radio bearers simultaneously active for the WCD is stored in the WCD or is otherwise available to the WCD. According to aspects, the radio bearers can be active in unacknowledged mode, UM, or in acknowledged mode, AM, e.g. in radio link control, RLC, UM, or in RLC AM.

The radio bearers are unicast radio bearers, hence radio bearers for unicast transmission. Expressed differently, the radio bearers are unicast radio bearers mapped to an EPS bearer. Stated differently, the radio bearers associated with the EPS bearer means that the radio bearers carry the EPS bearer.

As previously discussed with reference to FIG. 2, a maximum of eight radio bearers used for EPS bearers are available according to some aspects. A maximum of three radio bearers can be utilized in UM. However, when more than six radio bearers are concurrently used in AM, no radio bearer in UM can be set up. Hence, a shortage of radio bearers may occur. The claimed subject matter addresses this issue by determining S11 whether the number of radio bearers concurrently active for the WCD is at least one of: equal to a threshold value and above the threshold value. According to aspects, it is investigated how many radio bearers that are available or occupied in either UM, AM or both. According to aspects, the threshold is set to prevent the communication system from running out of available radio bearers. Hence, when the above criterion is fulfilled there is a risk of attaining shortage of radio bearers and thereby a need to rely on the default bearer, which may not have the characteristics required to maintain a high quality service.

According to aspects, the threshold value is predefined and equal to 3 radio bearers in UM, e.g. in Radio Link Control, RLC, Unacknowledged Mode, UM. For example, the wireless communication device in which a mission critical, MC, service client resides, detects that it is using three active radio bearers in UM, which in a 3GPP LTE system is the maximum number of radio bearers in UM.

According to aspects, the threshold value is predefined and equal to 5 radio bearers in AM, e.g. in Radio Link Control, RLC, Acknowledged Mode, AM. Hence, it may be possible to set up 1-3 radio bearers in UM as long as the number of radio bearers in AM is not above 5.

According to aspects, the threshold value is predefined and equal to 6 radio bearers in AM, e.g. Radio Link Control, RLC, Acknowledged Mode, AM. Even though there are two empty radio bearers left before the maximum of eight is reached, only bearers in RLC AM can be set up. For example, a mission critical, MC, service client (e.g. a wireless communication device) may report that there are six or more bearers in RLC AM, which would mean that it is not possible to setup a bearer in RLC UM.

According to aspects, the threshold value is predefined and equal to 8 radio bearers. Hence, all radio bearers are active (occupied or non-empty). In order to set up a new radio bearer in AM, at least one of the occupied radio bearers in AM must be emptied. In order to set up a new radio bearer in UM at least one to three radio bearers must be emptied. In the latter case, the number of required radio bearers that must be emptied depends on how many of the occupied radio bearers that are in UM, since no radio bearers in UM can be activated if the number of active radio bearers in AM is more than five.

The method at the WCD further comprises, when it is determined S11 that the number of radio bearers concurrently active for the WCD is at least one of: equal to the threshold value and above the threshold value (Yes-path out from S11), then transmitting S12, towards a control node 300, a first status message. Transmitting towards a node or similar implies that the transmitted message may pass via one or more nodes/functions or similar before it arrives at the destination, e.g. the control node 300 in this case. According to aspects, when the number of concurrently active radio bearers is reaching a point where communication loss might occur due to radio bearer shortage, then a first status message is transmitted towards a control node.

The first status message is indicative of that the number of radio bearers concurrently active has reached the threshold value. According to aspects, the first status message comprises information regarding the number of radio bearers concurrently active in at least one of: Unacknowledged Mode, UM, and Acknowledged Mode, AM. In one example, this means that the first status message may comprise the number of concurrently active radio bearers in UM and/or AM. In another example, the first status message comprises the number of non-active radio bearers in UM and/or AM. In a further example, the first status message only comprises an indication that the threshold value is reached. These examples can be mutually combined. Even other alternatives known to the skilled person, where the number of radio bearers concurrently active is indicated, may be used by themselves or in combination with one or several of the given examples.

In one example situation a mission critical, MC, service client reports to the MC service server that there are now three active radio bearers in UM. This gives an indication to the MC service server that additional radio bearers in UM cannot be accepted, until at least one of the already active radio bearers in UM are released.

According to further aspects, when it is determined S11 that the number of radio bearers concurrently active for the WCD is below the threshold value then there is no immediate risk of communication failure due to shortage of radio bearers and nothing will be done for a period of time. At a later point in time, a new determination S11 may be performed in order to investigate if the number of concurrently active radio bearers is still at an acceptable level where there is no risk of communication failure.

Hence, it is provided a method where the WCD is aware of the number of concurrently active radio bearers. If there exists a risk of losing communication due to the number of concurrently active radio bearers (in different modes) this information is passed on to a control node.

According to further aspects, the first status message, when received at the control node, is for determining whether the MBMS bearer is to be activated. Hence, in order to mitigate the risk of losing communication when the maximum number of radio bearers (in different modes) for the WCD has been reached, the control node is, according to aspects, able to determine if a multimedia broadcast service utilizing MBMS bearers can be utilized.

In one example, the control node activates an MBMS bearer and transfers an active service from one of the concurrently active radio bearers to the MBMS bearer. In another example, the control node activates an MBMS bearer and utilizes the MBMS bearer for a new service instead of using a radio bearer (since no ones are available) for unicast transmission. The WCD then receives S13, from the control node and in response to transmitting the first status message, an MBMS service announcement.

Service announcements are used to distribute service parameters among users. These parameters are required for the service activation, for example IP multicast addresses, Temporary Mobile Group Identity, TMGI. Thus, according to further aspects the MBMS service announcement comprises a Temporary Mobile Group Identity, TMGI, identifier. The TMGI is the identifier of the MBMS bearer carrying the service of interest for the wireless communication device.

In one example, the method further comprises receiving S14 communication associated with an active service distributed by the control node over the MBMS bearer and wherein the active service has been transferred, by the control node, from one of the concurrently active radio bearers to the MBMS bearer. Hence, a service previously provided by an active radio bearer for unicast has been transferred such that it is provided by an MBMS bearer instead. That is, when there is a risk of losing communication due to shortage of radio bearers, it is investigated if some of the active services can be provided by an MBMS bearer instead. If that is the case, the service is transferred to the MBMS bearer and the number of available radio bearers for unicast is increased.

In one example, there might not be any available radio bearers then, e.g. a mission critical, MC, service server may start to use an active MBMS bearer for group communication. The MC service server may also decide to transfer existing ongoing group communication over unicast to this MBMS bearer.

It is also of interest to be able to transfer an active service from an MBMS bearer to a unicast radio bearer when unicast radio bearers have been made available again. The transfer can be of a service that was previously transferred from a unicast radio bearer to a MBMS bearer or it can be of a service that was set-up by utilizing a MBMS bearer but which can be transmitted by a unicast radio bearer as well. Hence, the method at the WCD, further comprises determining S15 whether the number of radio bearers concurrently active for the WCD is below the threshold value. The threshold value of S15 may be the same as or different than the threshold value of S11. For example, the wireless communication device detects that not all radio bearers in UM are in use.

According to further aspects, when it is determined S15 that the number of radio bearers concurrently active for the WCD is below the threshold value (Yes-path out from S15), then the method comprises transmitting S16, toward a control node 300, a second status message indicative of that the number of radio bearers concurrently active has not reached the threshold value. According to aspects, the second status message comprises information regarding the number of unicast radio bearers concurrently active in at least one of: Unacknowledged Mode, UM, and Acknowledged Mode, AM. That is, in one example, this means that the second status message may comprise the number of concurrently active unicast radio bearers in UM and/or AM. In another example, the second status message comprises the number of non-active unicast radio bearers in UM and/or AM. In a further example, the second status message only comprises an indication that the threshold value is reached. These examples can also be combined and other alternatives, indicating the number of unicast radio bearers concurrently active, known to the skilled person may be used by themselves or in combination with one or several of the given examples. Further, the first status message and the second status message can according to aspects indicate the same information.

Hence, when the WCD detects that there are available unicast radio bearers it notifies the control node. In one example, a mission critical, MC, service client reports to the MC service server that not all bearers in UM are in use.

According to further aspects, when it is determined S15 that the number of unicast radio bearers concurrently active for the WCD is above or equal to the threshold value then there is still a risk of shortage of radio bearers and nothing will be done for a period of time. At a later point in time, a new determination S15 will be performed in order to investigate if there are available active unicast radio bearers to which an active service can be transferred without jeopardizing communication failure.

The disclosed subject matter mitigates the risk of losing information by utilizing MBMS bearers when the unicast radio bearers, and especially the radio bearers in UM, are occupied. The disclosed subject matter further provides for a return to providing a service by unicast radio bearers, when these are available again.

Example Node Operations in a Network Communication Node

Figure 5:
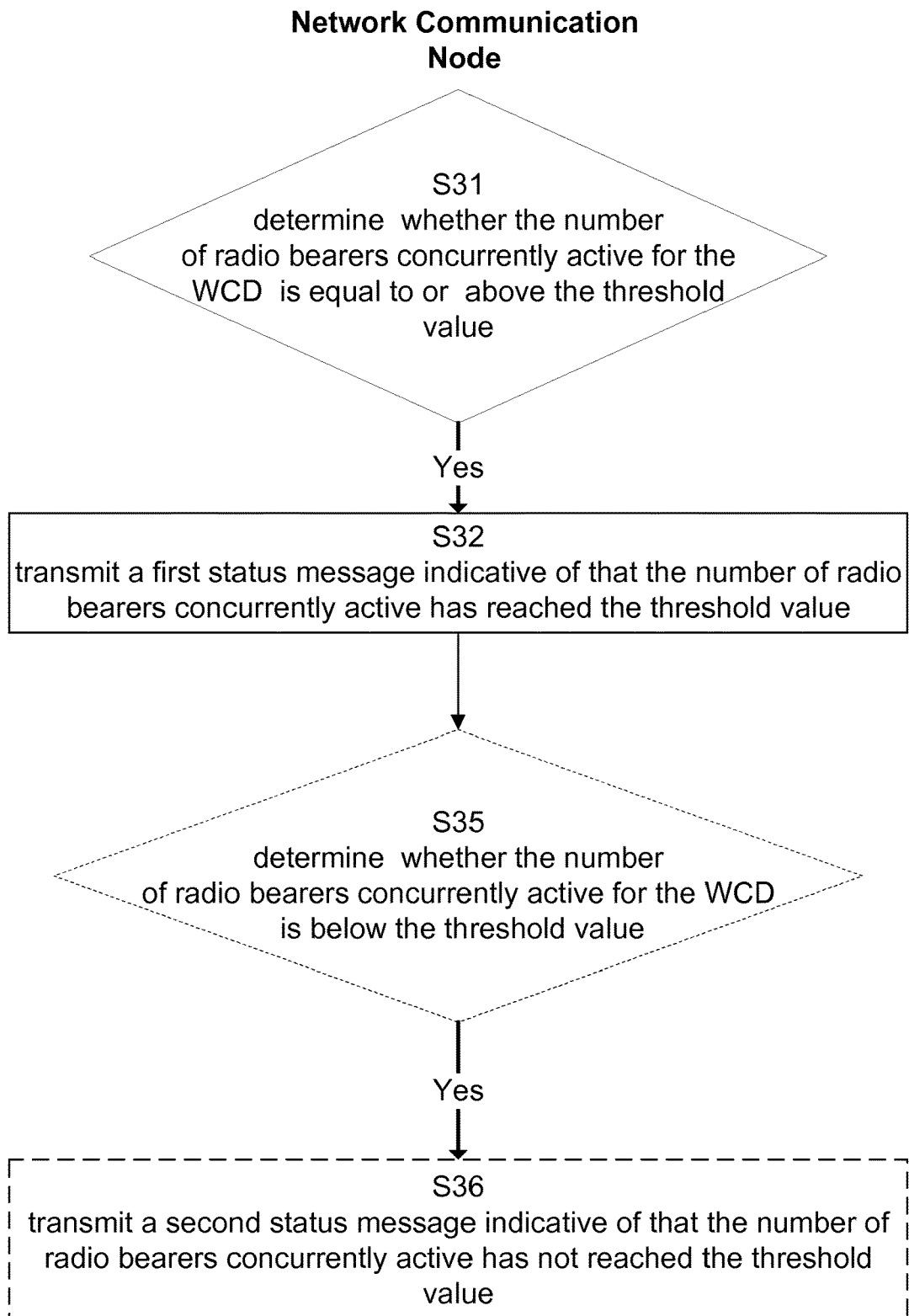

The disclosure also relates to corresponding methods performed in a network communication node. FIG. 5 shows an example flowchart of a method, at a network communication node 110, for bearer control in a wireless communication system 100. The network communication node is configured for both unicast service, using an Evolved Packet, EPS, bearer, and multimedia broadcast multicast service, MBMS, using an MBMS bearer. The network communication node is cognitive regarding a number of radio bearers concurrently active for a wireless communication device, WCD, 150, associated with the network communication node 110 and wherein the radio bearers are associated with the EPS bearer. The method comprises determining S31 whether the number of radio bearers concurrently active for the WCD is at least one of: equal to a threshold value and above the threshold value. The method further comprises, when it is determined S31 that the number of radio bearers concurrently active for the WCD is at least one of: equal to the threshold value and above the threshold value (Yes-path out from S31), then transmitting S32, to a control node 300, a first status message indicative of that the number of radio bearers concurrently active has reached the threshold value.

Hence, comparing FIGS. 4 and 5 it may be noticed that either or both of the wireless communication device and the network communication node can be a radio bearer aware node. A radio bearer aware node is a node with access to information of (i.e. cognitive regarding) the number of radio bearers concurrently active for the WCD in different nodes. Moreover, the determination S11, S31 and the transmission S12, S32, can take place in the WCD, the network communication node or in both either separately or in combination.

All steps described in relation to the method at the wireless communication device can also be steps of the corresponding method in the network communication node achieving the same advantages. Specifically, in one example a step of determining S35 is equivalent to the previously described determining step S15. In another example, a step of transmitting S36 a second status message is equivalent to the previously described transmitting step S16, cf. FIGS. 4 and 5.

Steps corresponding to S13 and S14 may also be present at the network communication node. However, a received MBMS service announcement and a received communication associated with an active service over the MBMS bearer, respectively, are just forwarded to the WCD.

Hence, it is provided for flexible methods to mitigate a need to rely on the default bearer, which may not have the characteristics required to maintain a high quality service since the knowledge of the number of radio bearers concurrently active for the WCD are made available either by the WCD or the network communication node. Further flexibility is provided since the determination regarding the number of concurrently active bearers for the WCD in relation to the threshold can be performed either by the WCD or the network communication node or a combination thereof.

Example Node Operations in a Control Node

The disclosure also relates to corresponding methods in a control node.

It is understood that several of the steps described in relation to methods in the control node correspond to steps performed in the previously described methods in the wireless communication device, WCD, and the network communication node, respectively. Thus, several aspects described in relation to those previous methods are present in the methods at the control node as well and are not repeated.

Figure 6:
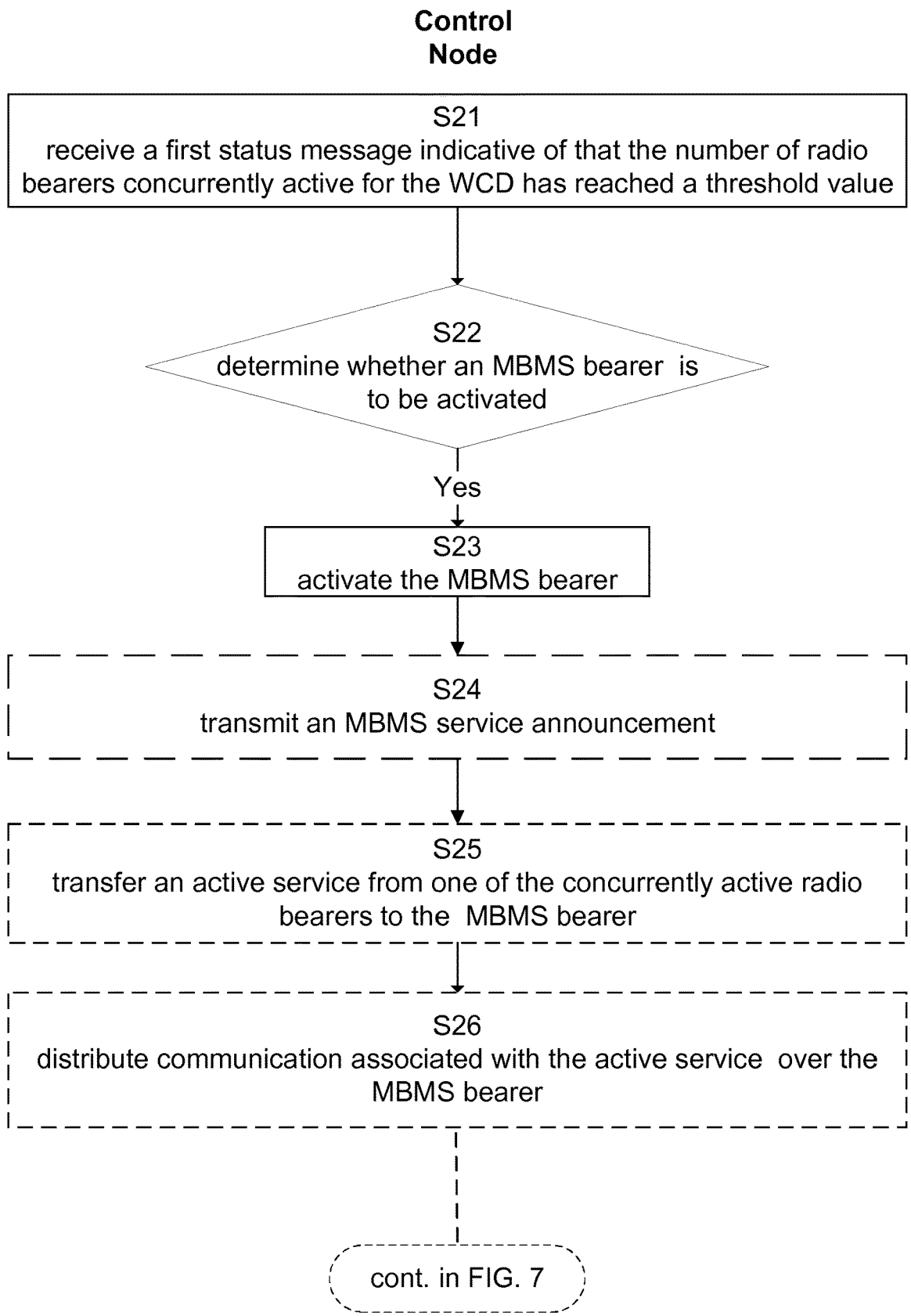
Figure 7:
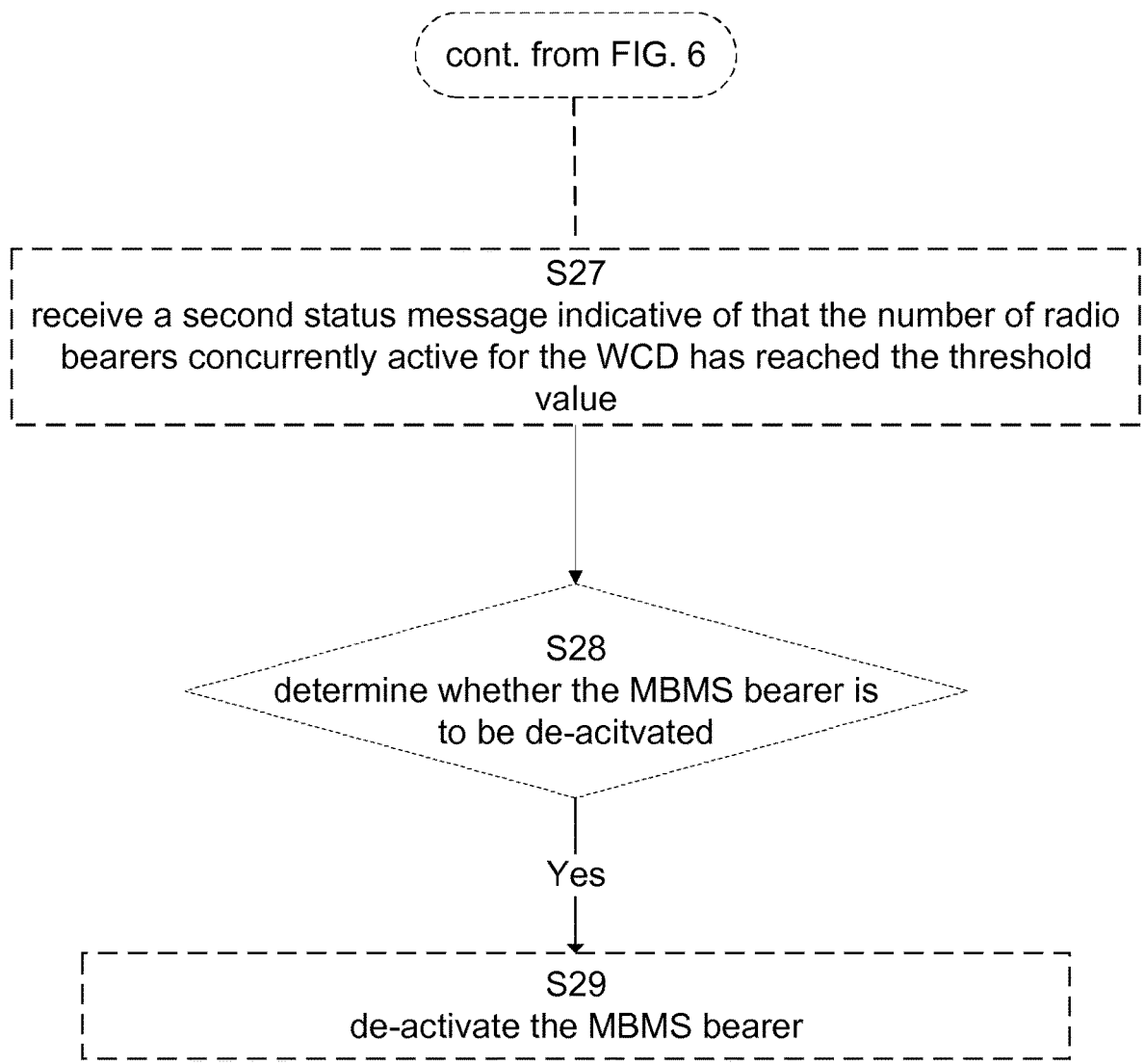

FIGS. 6 and 7 illustrate an example flowchart of a method, at a control node 300, for bearer control in a wireless communication system 100 according to some aspects of the disclosed subject matter. The control node is configured for control of both unicast service, using an Evolved Packet System, EPS, bearer, and multimedia broadcast multicast service, MBMS, using an MBMS bearer. Hence, the control node is capable to control communication in a wireless communication system in a unicast mode and in a broadcast mode.

The method comprises receiving S21, from a network communication node 110, a first status message indicative of that a number of radio bearers concurrently active for a Wireless Communication Device, WCD, has reached a threshold value, wherein the radio bearers are associated with the EPS bearer The step of receiving S21 a first status message, is analogue with the steps of transmitting S12 and S32 of FIGS. 4 and 5.

The WCD is associated with the network communication node. In one example, the first status message is first transmitted from the WCD to the network communication node before it is transmitted to the control node.

Further, at least one of the network communication node and the WCD is cognitive regarding the number of radio bearers concurrently active for the WCD. In other words, the information comprising the number of radio bearers simultaneously active for the WCD is stored in the WCD or available to the WCD. In one example, the first status message comprises information regarding the number of radio bearers concurrently active for the WCD in at least one of: Unacknowledged Mode, UM, and Acknowledged Mode, AM. In other words, the radio bearer can be active in radio link control, RLC, unacknowledged mode, UM, or in RLC acknowledged mode, AM.

For example a mission critical, MC, service client (i.e. the wireless communication device or the network communication node) reports to the MC service server (i.e. the control node) that there are three active EPS bearers in UM. This gives an indication to the MC service server that additional EPS bearers in UM cannot be accepted, until at least one of the already active EPS bearers in UM are released.

In response to the reception S21 of the first status message, the method at the control node further comprises determining S22, based on that the number of radio bearers concurrently active for the WCD has reached the threshold value, whether an MBMS bearer is to be activated. In other words, it is evaluated, based on the first status message, if it is suitable to activate an MBMS bearer and transfer a service presently utilizing a unicast radio bearer to a MBMS bearer in order to release radio bearer resources and thereby mitigate the risk of a communication drop.

Several aspects can be evaluated in order to reach a decision. For example, to be able to transfer a service to a MBMS bearer it must be a service that can be transmitted by such bearer. Such services can for example be push to talk, PTT, group calls, mobile television, news updates via file downloads, operator home pages pre-downloaded to mobiles, local content distribution, traffic information, software downloads to terminals and distribution of emergency information.

According to further aspects, the determination S22 whether an MBMS bearer is to be activated, is further based on at least one of a number of group communication users in a cell, a number of users that are interested in a specific group call, specific performance requirements related to the use of multicast transmission mode, and expected traffic volume.

The method at the control node further comprises, when it is determined S22 that the MBMS bearer is to be activated (Yes-path out from S22), activating S23 the MBMS bearer. Further, when it is determined that the MBMS bearer is not to be activated, no MBMS bearer is activated.

In one example, a mission critical, MC, service server evaluates the received information and may decide to start an MBMS bearer to be used for group communication. The use of the MBMS bearer would mitigate the risk of communication failure due to that the limited number of EPS bearers in UM has been reached.

In another example the MC service server may decide to transfer existing ongoing group communication over unicast to MBMS bearer in order to release radio bearers.

Hence, the control node is informed of the radio bearer availability of the WCD. If there is a shortage of radio bearers available to the WCD, the control node may utilize MBMS bearers for some services in order to avoid a risk of losing communication due to the fact that a maximum number of radio bearers for the WCD have been reached.

In one example, the method further comprises, in response to determining that the MBMS bearer is to be activated, transmitting S24, to the WCD, an MBMS service announcement. According to further aspects, the MBMS service announcement comprises a Temporary Mobile Group Identity, TMGI, identifier.

In one example, the method further comprises transferring S25 an active service from one of the concurrently active radio bearers to the MBMS bearer. The service that is transferred from e.g. a radio bearer in UM must be suitable for transmittance by a MBMS bearer.

In response to the transfer S25, the method comprises distributing S26 communication associated with the active service, to the WCD, over the MBMS bearer. Hence, MBMS bearers are utilized for group communication of the active service.

The step of distributing S26 communication is analogue with the step of receiving S14 of FIG. 4.

Alternatively, when a new service is to be started and it is concluded that no unicast radio bearers are available. If it is possible to transmit the new service by MBMS bearers then the communication associated with the new service is distributed over the MBMS bearer.

Hence, it is provided for a method, in the control node, where MBMS bearers can be utilized instead of unicast radio bearers when a wireless communication device experience shortage of radio bearers, specifically radio bearers in unacknowledged mode, UM.

It is also of interest to transfer an active service from an MBMS bearer to a unicast radio bearer when unicast radio bearers have been made available again. This could be a service that was previously transferred from a unicast radio bearer to a MBMS bearer or it can be a service that was set-up by utilizing a MBMS bearer but which can be transmitted by a unicast radio bearer as well. Hence, the method at the control node, further comprises receiving S27, from the network communication node, a second status message indicative of that the number of radio bearers concurrently active has not reached the threshold value, wherein at least one of the network communication node and the WCD is cognitive regarding the number of radio bearers concurrently active for the WCD. For example, a mission critical, MC, service client (i.e. the wireless communication device or the network communication node) reports to the MC service server that not all bearers in UM are in use.

The step of receiving S27 a second status message, is analogue with the steps of transmitting S16 and S36 of FIGS. 4 and 5.

In one example, and in response to, the reception S27 of the second status message, the method at the control node further comprises determining S28, based on the second status message, whether the MBMS bearer is to be de-activated. In other words, it is evaluated if it is suitable to de-activate an MBMS bearer and transfer a service presently utilizing an MBMS bearer to a unicast radio bearer (in UM). The same aspects may be evaluated as was previously discussed in relation to the determination step S22.

In one example, a mission critical, MC, service server may re-evaluate the need to use MBMS for group communication, and if MBMS is not needed then the service is transferred to a unicast radio bearer in UM.

In a further example, when it is determined S28 that the MBMS bearer is to be de-activated (Yes-path out from S28), the method comprises de-activating S29 the MBMS bearer.

Figure 8:
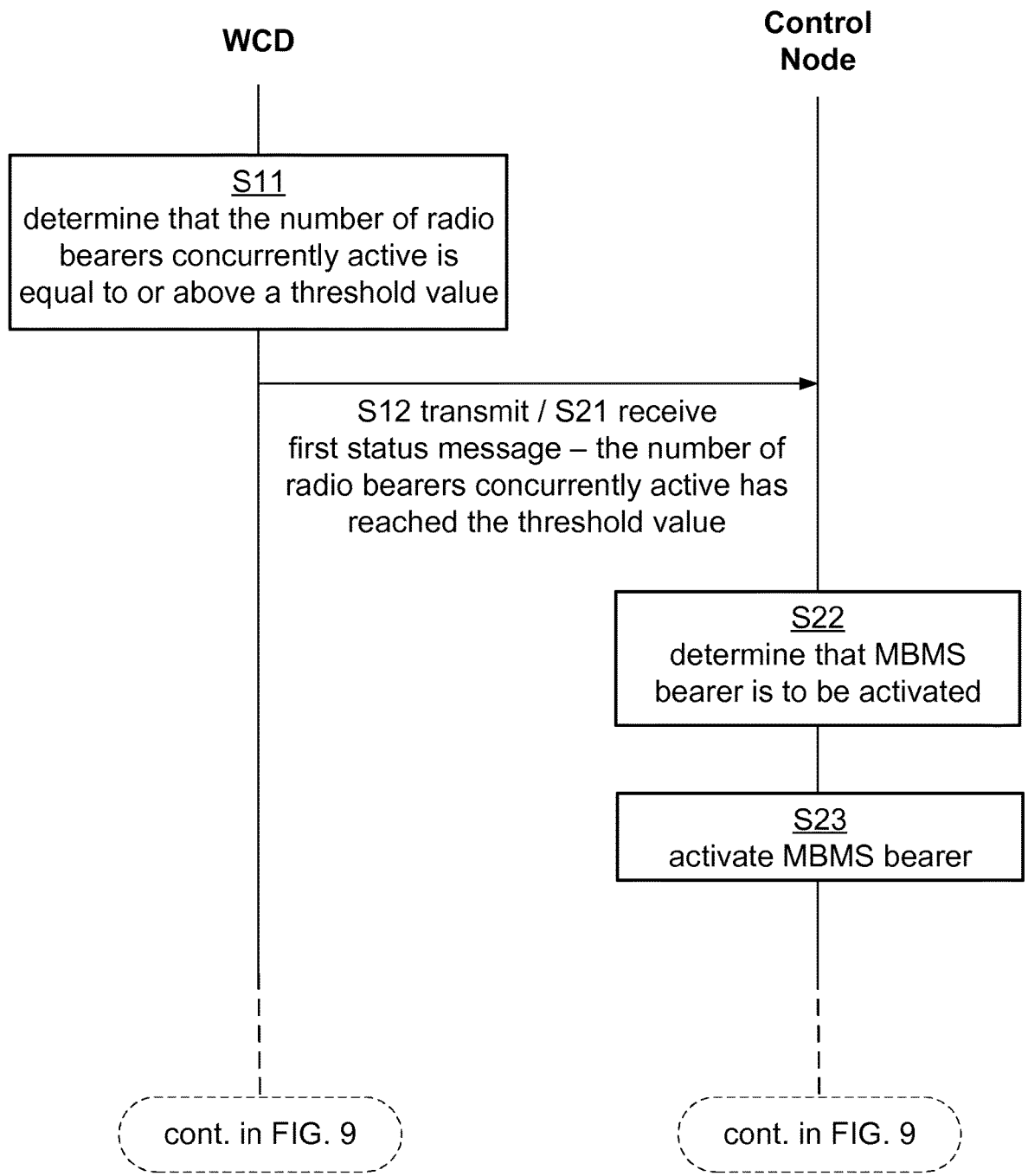
FIGS. 8 and 9 are signalling diagrams illustrating example signalling according to some embodiments.
Figure 9:
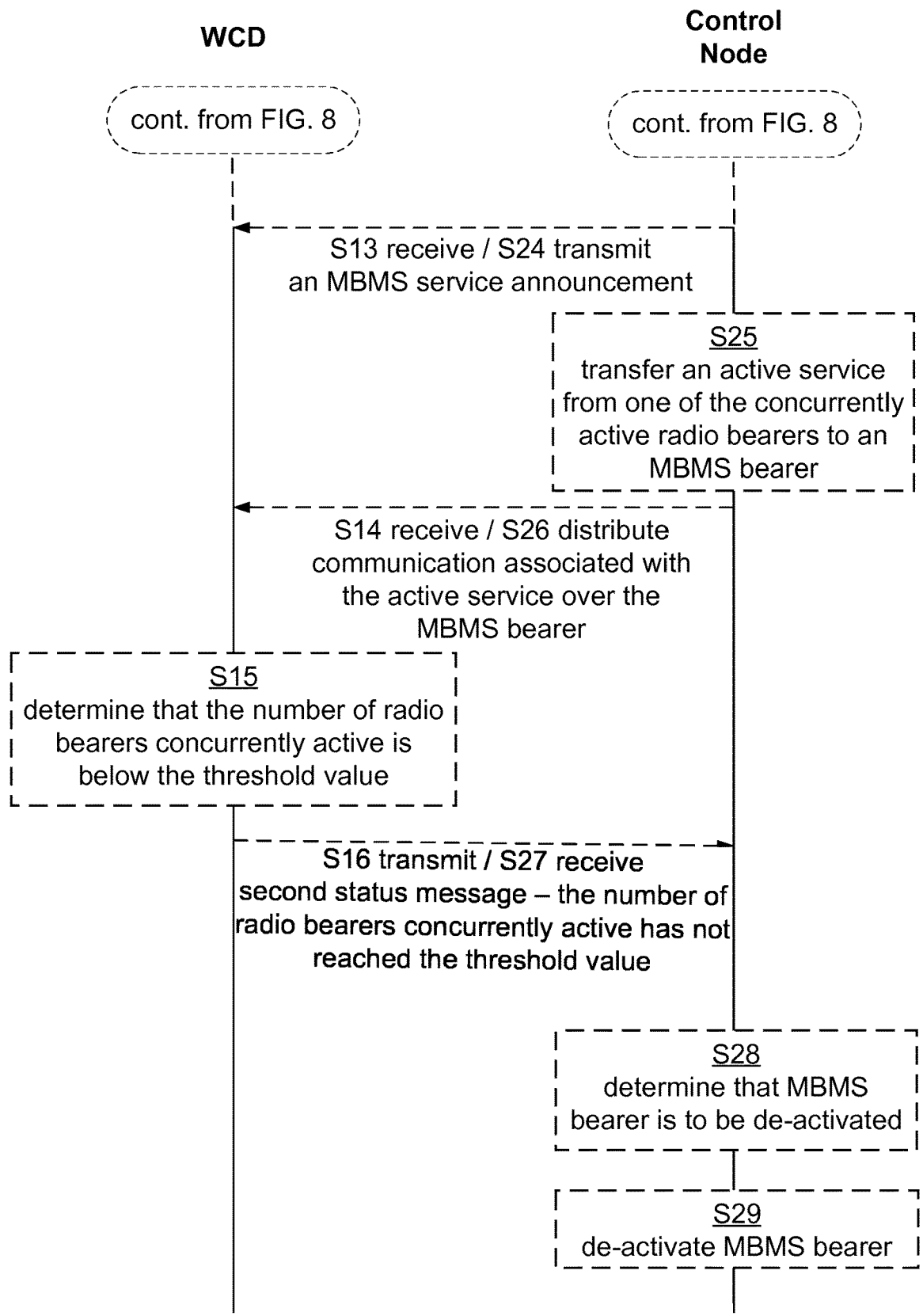

FIGS. 8-9 illustrate an example of a signalling scheme between a wireless communication device and a control node (typically via a network node, not shown) as previously discussed. The example signalling scheme illustrates the relation between method steps as described in connection with FIGS. 3, 5 and 6, and the same reference numbers are used.

A similar signalling scheme (not shown) applies to the example situation where the network communication node is aware of the number of radio bearers concurrently active for the WCD. However, the steps corresponding to reception of an MBMS service announcement (i.e. S13) and the reception of communication associated with the active service over the MBMS bearer (i.e. S14), is replaced by steps that relay the announcement and the communication, respectively, to the WCD.

Example Node Operations in a Wireless Communication System

One or many of the previously described method steps performed in a wireless communication device, a network communication node, or a control node, respectively, can in some example be performed as steps in a method for bearer control in a wireless communication system 100. According to this example the wireless communication system comprises a control node 300 configured for control of both unicast service, using an Evolved Packet System, EPS, bearer, and Multimedia Broadcast Multicast Service, MBMS, using an MBMS bearer. The wireless communication system further comprises a network communication node 110, wherein both a Wireless Communication Device, WCD 150, associated with the network communication node, and the network communication node are configured for both unicast service, using the EPS bearer, and MBMS, using the MBMS bearer.

Both the WCD and the network communication node are cognitive regarding a number of radio bearers concurrently active for the WCD wherein the radio bearers are associated with the EPS bearer. In one example embodiment only the WCD has knowledge of the number of radio bearers concurrently active whereas in another example embodiment it can be only the network communication node.

The method in the wireless communication system comprises determining S11, by the WCD or the network communication node, whether the number of radio bearers concurrently active for the WCD is at least one of: equal to a threshold value and above the threshold value. In one example embodiment the determination takes place both in the WCD and in the network communication node.

In the case that it is determined that the number of radio bearers concurrently active for the WCD is below the threshold value, then nothing is done.

In the case that it is determined S11 that the number of radio bearers concurrently active for the WCD is at least one of: equal to the threshold value and above the threshold value, then the WCD or the network communication node transmits S12 and towards the control node 300 a first status message. This first status message is indicative of that the number of radio bearers concurrently active for the WCD has reached the threshold value.

The control node receives S21, the first status message. In response to the reception S21 of the first status message, the control node determines S22, based on that the number of radio bearers concurrently active for the WCD has reached the threshold value, whether an MBMS bearer is to be activated.

If it is decided that no MBMS bearer is to be activated then nothing is done.

However, when it is determined S22 that the MBMS bearer is to be activated, the control node activates S23 the MBMS bearer and may transmit, S24, an MBMS service announcement.

The same exemplifications and further elaborations are to be applied as well as the same advantages and benefits are to be obtained as for the corresponding features and steps of the previously discussed examples, respectively.

Example Computer Program Products

Figure 10:
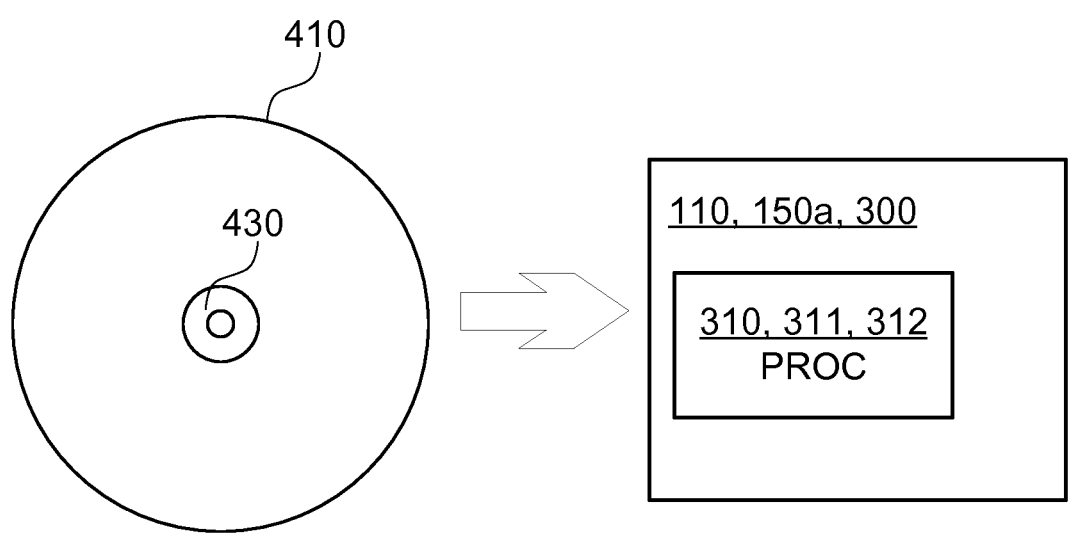
FIG. 10 is a schematic drawing of an example computer program product comprising computer readable means according to some embodiments.

In the example of FIG. 10, a computer program product 410 comprising a non-transitory computer readable medium 430 storing a computer program is illustrated. The computer program product 410 is illustrated as an optical disc, such as a CD (compact disc) or a DVD (digital versatile disc) or a Blu-Ray disc. The computer program product 410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

According to some embodiments, a computer program for bearer control in a wireless communication system 100 is stored on the non-transitory computer-readable medium 430. The computer program being loadable into a data processing unit 310 comprising processing circuitry of a Wireless Communication Device, WCD 150. The computer program comprising program instructions which, when run by the processing circuitry, causes the WCD to execute the method according to the method illustrated in FIG. 4.

According to some embodiments, a computer program for bearer control in a wireless communication system 100 is stored on the non-transitory computer-readable medium 430, the computer program being loadable into a data processing unit 311 comprising processing circuitry of a network communication node 110, the computer program comprising program instructions which, when run on the processing circuitry, causes the network communication node to execute the method according to the method illustrated in FIG. 5.

According to some embodiments, a computer program for bearer control in a wireless communication system 100 is stored on the non-transitory computer-readable medium 430, the computer program being loadable into a data processing unit 312 comprising processing circuitry of a control node, the computer program comprising program instructions which, when run on the processing circuitry, causes the control node to execute the method according to the method illustrated in FIGS. 6-7.

Example Arrangements

Example arrangements for a wireless communication device, a communication network node and a control node, respectively, are now discussed with reference to FIGS. 11A, 12A, 13A.

The same exemplifications and further elaborations are to be applied as well as the same advantages and benefits are to be obtained as for the corresponding features and steps of the previously discussed examples, respectively.

The embodiments to be described and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node (access point).

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 11A:
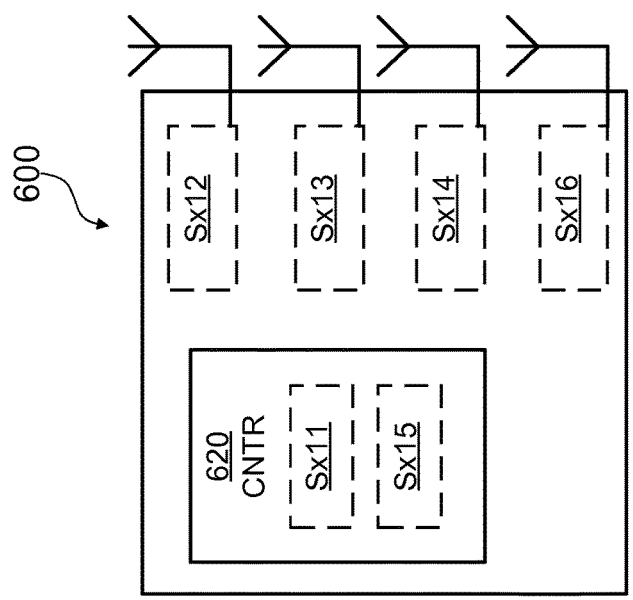
FIGS. 11A and 11B are schematic block diagrams illustrating, respectively, an example arrangement for a WCD and an example WCD according to some embodiments.

Example Arrangement for a Wireless Communication Device and an Example Wireless Communication Device FIG. 11A is a schematic illustration of an example arrangement 600 for a wireless communication device, WCD, for bearer control in a wireless communication system 100, according to some embodiments. The WCD is configured for both unicast service, using an Evolved Packet System, EPS, bearer, and multimedia broadcast multicast service, MBMS, using an MBMS bearer. The WCD is cognitive regarding a number of radio bearers concurrently active for the WCD 150 and wherein the radio bearers are associated with the EPS bearer. The arrangement 600 comprises a controller 620. The controller 620 is configured to cause determination whether the number of radio bearers concurrently active for the WCD is at least one of: equal to a threshold value and above the threshold value. Responsive to determination that the number of radio bearers concurrently active for the WCD is at least one of: equal to the threshold value and above the threshold value the controller is configured to cause transmission, towards a control node 300, of a first status message indicative of that the number of radio bearers concurrently active has reached the threshold value.

According to aspects, the first status message comprises information regarding the number of radio bearers concurrently active in at least one of: Unacknowledged Mode, UM, and Acknowledged Mode, AM.

According to aspects, the first status message, when received at the control node, is for determination whether the MBMS bearer is to be activated.

According to aspects, the controller is further configured to cause reception, from the control node and in response to transmission of the first status message, of an MBMS service announcement. In one example the MBMS service announcement comprises a Temporary Mobile Group Identity, TMGI, identifier.

According to aspects, the controller is further configured to cause reception of communication associated with an active service distributed by the control node over the MBMS bearer. Further, the active service has been transferred, by the control node, from one of the concurrently active radio bearers to the MBMS bearer.

According to aspects, the controller is further configured to cause determination whether the number of radio bearers concurrently active for the WCD is below the threshold value. Responsive to determination that the number of radio bearers concurrently active for the WCD is below the threshold value the controller is configured to cause transmission toward a control node 300, of a second status message indicative of that the number of radio bearers concurrently active has not reached the threshold value.

According to aspects, the threshold value is predefined and equal to one of 3 radio bearers in Radio Link Control, RLC, Unacknowledged Mode, UM, 5 radio bearers in Radio Link Control, RLC, Acknowledged Mode, AM, 6 radio bearers in Radio Link Control, RLC, Acknowledged Mode, AM, and 8 radio bearers.

FIG. 11A further schematically illustrates, in terms of a number of functional modules, the components of a wireless communication device, WCD, 600, according to aspects.

According to some aspects the disclosure proposes a wireless communication device, WCD, 600, for bearer control in a wireless communication system 100. The WCD is configured for both unicast service, using an Evolved Packet System, EPS, bearer, and multimedia broadcast multicast service, MBMS, using an MBMS bearer, and wherein the WCD is cognitive regarding a number of radio bearers concurrently active for the WCD, 150, and wherein the radio bearers are associated with the EPS bearer. The WDC comprises
- a first determination module Sx11 configured to determine whether the number of radio bearers concurrently active for the WCD is at least one of: equal to a threshold value and above the threshold value; and
- a first transmission module Sx12 configured to transmit, when it is determined that the number of radio bearers concurrently active for the WCD is at least one of: equal to the threshold value and above the threshold value, towards a control node 300, a first status message indicative of that the number of radio bearers concurrently active has reached the threshold value.

According to further aspects, the first status message, comprises information regarding the number of radio bearers concurrently active in at least one of: Unacknowledged Mode, UM, and Acknowledged Mode, AM.

According to further aspects, the first status message, when received at the control node, is for determining whether the MBMS bearer is to be activated.

According to further aspects, the WCD further comprises:
- a first reception module Sx13 configured to receive, from the control node and in response to transmitting the first status message, an MBMS service announcement.

According to further aspects, the MBMS service announcement comprises a Temporary Mobile Group Identity, TMGI, identifier.

According to further aspects, the WCD, 600, further comprises:
- a second reception module Sx14 configured to receive communication associated with an active service distributed by the control node over the MBMS bearer and wherein the active service has been transferred, by the control node, from one of the concurrently active radio bearers to the MBMS bearer.

The first reception module Sx13 and the second reception module Sx14 can be separate modules, comprised in the same module or be the same module.

According to further aspects, the WCD, 600, further comprises:
- a second determination module Sx15 configured to determine whether the number of radio bearers concurrently active for the WCD is below the threshold value; and
- a second transmission module Sx16 configured to transmit, when it is determined that the number of radio bearers concurrently active for the WCD is below the threshold value, toward a control node 300, a second status message indicative of that the number of radio bearers concurrently active has not reached the threshold value.

The first determination module Sx11 and the second determination module Sx15 can be separate modules, comprised in the same module or be the same module. Likewise, the first transmission module Sx12 and the second transmission module Sx14 can be separate modules, comprised in the same module or be the same module.

According to further aspects, the threshold value is predefined and equal to one of:
- 3 radio bearers in Radio Link Control, RLC, Unacknowledged Mode, UM;
- 5 radio bearers in Radio Link Control, RLC, Acknowledged Mode, AM;
- 6 radio bearers in Radio Link Control, RLC, Acknowledged Mode, AM; and
- 8 radio bearers.

According to some aspects the modules are comprised in the controller 620, but they can also be positioned external to the controller and be associated with the controller.

The modules may in some embodiments comprise circuitry configured to cause the module to perform tasks as described in reference to the previously described aspects and embodiments.

In some embodiments, any of the above aspects may additionally have features and/or advantages identical with or corresponding to any of the various features and/or advantages as explained above for any of the other aspects.

Figure 11B:
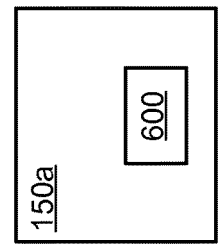

The disclosed subject matter further relates to a wireless communication device 150, figuratively illustrated in FIG. 11B. The wireless communication device comprises the arrangement 600. All aspects, examples and advantages discussed in relation to the arrangement apply accordingly to the wireless communication device 150.

Figure 12A:
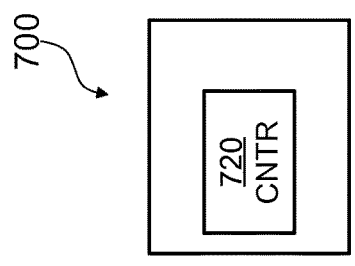
FIGS. 12A and 12B are schematic block diagrams illustrating, respectively, an example arrangement for a network communication node and an example network communication node according to some embodiments.

Example Arrangement for a Network Communication Node and an Example Network Communication Node FIG. 12A is a schematic illustration of an example arrangement 700 for a network communication node 110, for bearer control in a wireless communication system 100, according to aspects of the disclosed subject matter. The network communication node is configured for both unicast service, using an Evolved Packet System, EPS, bearer, and multimedia broadcast multicast service, MBMS, using an MBMS bearer. The network communication node is cognitive regarding a number of radio bearers concurrently active for a wireless communication device, WCD, 150, associated with the network communication node 110 and wherein the radio bearers are associated with the EPS bearer. The arrangement 700 comprises a controller 720 configured to cause determination whether the number of radio bearers concurrently active for the WCD is at least one of: equal to a threshold value and above the threshold value. Responsive to determination that the number of radio bearers concurrently active for the WCD is at least one of: equal to the threshold value and above the threshold value, the controller is configured to cause transmission, to a control node 300, of a first status message indicative of that the number of radio bearers concurrently active has reached the threshold value.

The example arrangement 700 in FIG. 12A may further comprise a number of functional modules (not shown), analogue to the corresponding method steps discussed in reference to FIG. 5.

Figure 12B:
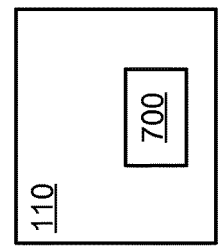

The disclosed subject matter further relates to a network communication node 110, figuratively illustrated in FIG. 12B. The wireless communication device comprises the arrangement 700. All aspects, examples and advantages discussed in relation to the arrangement apply accordingly to the wireless communication device 150.

Example Arrangement for a Control Node and an Example Control Node

Figure 13A:
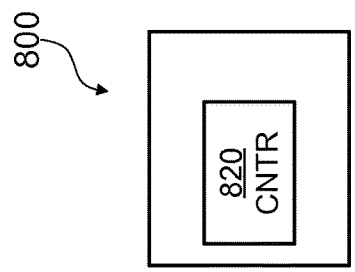
FIGS. 13A and 13B are schematic block diagrams illustrating, respectively, an example arrangement for a control node and an example control node according to some embodiments.

FIG. 13A is a schematic illustration of an example arrangement 800, for a control node 300, for bearer control in a wireless communication system 100, according to aspects of the disclosed subject matter. The control node is configured for control of both unicast service, using an Evolved Packet System, EPS, bearer, and multimedia broadcast multicast service, MBMS, using an MBMS bearer. The arrangement 800 comprising a controller 820 configured to cause reception, from a network communication node 110, of a first status message indicative of that the number of radio bearers concurrently active for a Wireless Communication Device, WCD, associated with the network communication node has reached a threshold value. Further, at least one of the network communication node and the WCD is cognitive regarding a number of radio bearers concurrently active for the WCD and wherein the radio bearers are associated with the EPS bearer. Responsive to the reception of the first status message, the controller is configured to cause determination, based on that the number of radio bearers concurrently active for the WCD has reached the threshold value, whether an MBMS bearer is to be activated. Responsive to determination that the MBMS bearer is to be activated the controller is configured to cause activation of the MBMS bearer.

According to aspects, the first status message comprises information regarding the number of radio bearers concurrently active for the WCD in at least one of: Unacknowledged Mode, UM, and Acknowledged Mode, AM.

According to aspects, the controller is further configured to cause, responsive to the determination that the MBMS bearer is to be activated transmission, to the WCD, of an MBMS service announcement. In one example, the MBMS service announcement comprises a Temporary Mobile Group Identity, TMGI, identifier.

According to aspects, the controller is further configured to cause transfer of an active service from one of the concurrently active radio bearers to the MBMS bearer. In response to the transfer distribution of communication associated with the active service, to the WCD, over the MBMS bearer.

According to aspects, the controller is further configured to cause reception, from the network communication node, of a second status message indicative of that the number of radio bearers concurrently active has not reached the threshold value, wherein at least one of the network communication node and the WCD is cognitive regarding the number of radio bearers concurrently active for the WCD. In response to the reception of the second status message the controller is configured to cause determination S28, based on the second status message, whether the MBMS bearer is to be de-activated. Responsive to determination that the MBMS bearer is to be de-activated, the controller is configured to cause de-activation of the MBMS bearer.

The example arrangement 800 in FIG. 13A may further comprise a number of functional modules (not shown), analogue to the corresponding method steps discussed in reference to FIGS. 6-7.

Figure 13B:
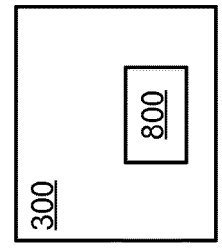

The disclosed subject matter further relates to a control node 300, figuratively illustrated in FIG. 13B. The wireless communication device comprises the arrangement 800. All aspects, examples and advantages discussed in relation to the arrangement apply accordingly to the wireless communication device 150.

Some embodiments aim at mitigating the risk of group communication failure due to that the limited number of radio bearers in UM has been reached. This is achieved by the use of MBMS transmission. New or ongoing calls may use the MBMS bearer, and therefore be independent on available radio bearers. To exemplify, a wireless communication device reports to the group communication system, i.e. the control node, the number of radio bearers that are used. If the wireless communication device reports that there are now three radio bearers in unacknowledged mode active, this would be an indication to the group communication system that multicast transmission would be desirable to avoid a risk of losing communication due to the maximum number of radio bearers have been reached.

The proposed solutions have mainly been described above with reference to a few embodiments. However, as is readily appreciated by a person skilled in the art, other embodiments than the ones disclosed above are equally possible within the scope of the disclosure, as shown by the appended list of enumerated embodiments denoted items.

1. A method for bearer control in a wireless communication system (100), the wireless communication system comprising:
   a control node (300) configured for control of both unicast service, using an Evolved Packet System, EPS, bearer, and Multimedia Broadcast Multicast Service, MBMS, using an MBMS bearer;
   a network communication node (110), wherein both a Wireless Communication Device, WCD (150), associated with the network communication node, and the network communication node are configured for both unicast service, using the EPS bearer, and MBMS, using the MBMS bearer, and are cognitive regarding a number of radio bearers concurrently active for the WCD, and wherein the radio bearers are associated with the EPS bearer;
   the method comprising:
      determining (S11), by the WCD or the network communication node, whether the number of radio bearers concurrently active for the WCD is at least one of: equal to a threshold value and above the threshold value; and
      when it is determined (S11) that the number of radio bearers concurrently active for the WCD is at least one of: equal to the threshold value and above the threshold value, then;
      transmitting (S12), by the WCD or the network communication node and towards the control node (300), a first status message indicative of that the number of radio bearers concurrently active for the WCD has reached the threshold value;
      receiving (S21), by the control node, the first status message; and in response to the reception (S21) of the first status message:
         determining (S22), by the control node, based on that the number of radio bearers concurrently active for the WCD has reached the threshold value, whether an MBMS bearer is to be activated; and
         when it is determined (S22) that the MBMS bearer is to be activated;
         activating (S23) the MBMS bearer by the control node.

2. A method, at a wireless communication device, WCD, (150), for bearer control in a wireless communication system (100), wherein the WCD is configured for both unicast service, using an Evolved Packet System, EPS, bearer, and multimedia broadcast multicast service, MBMS, using an MBMS bearer, wherein the WCD is cognitive regarding a number of radio bearers concurrently active for the WCD (150), and wherein the radio bearers are associated with the EPS bearer;
the method comprising:
   determining (S11) whether the number of radio bearers concurrently active for the WCD is at least one of: equal to a threshold value and above the threshold value; and
   when it is determined (S11) that the number of radio bearers concurrently active for the WCD is at least one of: equal to the threshold value and above the threshold value, then
      transmitting (S12), towards a control node (300), a first status message indicative of that the number of radio bearers concurrently active has reached the threshold value.
3. The method according to item 2, wherein the first status message, comprises information regarding the number of radio bearers concurrently active in at least one of: Unacknowledged Mode, UM, and Acknowledged Mode, AM.
4. The method according to any of the items 2-3, wherein the first status message, when received at the control node, is for determining whether the MBMS bearer is to be activated.
5. The method according to any of the items 2-4, further comprising:
receiving (S13), from the control node and in response to transmitting the first status message, an MBMS service announcement.
6. The method according to item 5, wherein the MBMS service announcement comprises a Temporary Mobile Group Identity, TMGI, identifier.
7. The method according to any of the items 2-6, further comprising:
receiving (S14) communication associated with an active service distributed by the control node over the MBMS bearer and wherein the active service has been transferred, by the control node, from one of the concurrently active radio bearers to the MBMS bearer.
8. The method according to item 7, further comprising:
determining (S15) whether the number of radio bearers concurrently active for the WCD is below the threshold value; and
when it is determined (S15) that the number of radio bearers concurrently active for the WCD is below the threshold value then
   transmitting (S16), toward a control node (300), a second status message indicative of that the number of radio bearers concurrently active has not reached the threshold value.
9. The method according to any of the items 2-8, wherein the threshold value is predefined and equal to one of:
3 radio bearers in Radio Link Control, RLC, Unacknowledged Mode, UM;
5 radio bearers in Radio Link Control, RLC, Acknowledged Mode, AM;
6 radio bearers in Radio Link Control, RLC, Acknowledged Mode, AM; and
8 radio bearers.

10. A method, at a network communication node (110), for bearer control in a wireless communication system (100), wherein the network communication node is configured for both unicast service, an Evolved Packet System, EPS, bearer, and multimedia broadcast multicast service, MBMS, using an MBMS bearer, and wherein the network communication node is cognitive regarding a number of radio bearers concurrently active for a wireless communication device, WCD, (150), associated with the network communication node (110), and wherein the radio bearers are associated with the EPS bearer;
the method comprising:
   determining (S31) whether the number of radio bearers concurrently active for the WCD is at least one of: equal to a threshold value and above the threshold value; and when it is determined (S31) that the number of radio bearers concurrently active for the WCD is at least one of: equal to the threshold value and above the threshold value, then
      transmitting (S32), to a control node (300), a first status message indicative of that the number of radio bearers concurrently active has reached the threshold value.
11. A method, at a control node (300), for bearer control in a wireless communication system (100), wherein the control node is configured for control of both unicast service, using an Evolved Packet System, EPS, bearer, and multimedia broadcast multicast service, MBMS, using an MBMS bearer, the method comprising:
receiving (S21), from a network communication node (110), a first status message indicative of that a number of radio bearers concurrently active for a Wireless Communication Device, WCD, associated with the network communication node has reached a threshold value, wherein at least one of the network communication node and the WCD is cognitive regarding the number of radio bearers concurrently active for the WCD, and wherein the radio bearers are associated with the EPS bearer; and
in response to the reception (S21) of the first status message:
   determining (S22), based on that the number of radio bearers concurrently active for the WCD has reached the threshold value, whether an MBMS bearer is to be activated; and
   when it is determined (S22) that the MBMS bearer is to be activated:
      activating (S23) the MBMS bearer.
12. The method according to item 11, wherein the first status message, comprises information regarding the number of radio bearers concurrently active for the WCD in at least one of: Unacknowledged Mode, UM, and Acknowledged Mode, AM.
13. The method according to any of the items 11-12, further comprising, in response to determining that the MBMS bearer is to be activated:
transmitting (S24), to the WCD, an MBMS service announcement.
14. The method according to item 13, wherein the MBMS service announcement comprises a Temporary Mobile Group Identity, TMGI, identifier.
15. The method according to any of the items 11-14, further comprising:
transferring (S25) an active service from one of the concurrently active radio bearers to the MBMS bearer; and
in response to the transfer (S25):

distributing (S26) communication associated with the active service, to the WCD, over the MBMS bearer.

16. The method according to any of the items 11-15, further comprising:
    receiving (S27), from the network communication node, a second status message indicative of that the number of radio bearers concurrently active has not reached the threshold value, wherein at least one of the network communication node and the WCD is cognitive regarding the number of radio bearers concurrently active for the WCD; and
    in response to the reception (S27) of the second status message:
    determining (S28), based on the second status message, whether the MBMS bearer is to be de-activated; and
    when it is determined (S28) that the MBMS bearer is to be de-activated:
    de-activating (S29) the MBMS bearer.

17. A computer program for bearer control in a wireless communication system (100), the computer program being loadable into a data processing unit (310) comprising processing circuitry of a Wireless Communication Device, WCD, (150), the computer program comprising program instructions which, when run by the processing circuitry, causes the WCD to execute the method according to any of the items 2-10.

18. A computer program for bearer control in a wireless communication system (100), the computer program being loadable into a data processing unit (311) comprising processing circuitry of a network communication node (110), the computer program comprising program instructions which, when run on the processing circuitry, causes the network communication node to execute the method according to item 11.

19. A computer program for bearer control in a wireless communication system (100), the computer program being loadable into a data processing unit (312) comprising processing circuitry of a control node, the computer program comprising program instructions which, when run on the processing circuitry, causes the control node to execute the method according to any of the items 12-17.

20. A computer program product (410) comprising a non-transitory computer readable medium (430) storing a computer program according to any of the items 18-20.

21. An arrangement (600) for a wireless communication device, WCD, for bearer control in a wireless communication system (100), wherein the WCD is configured for both unicast service, using an Evolved Packet System, EPS, bearer, and multimedia broadcast multicast service, MBMS, using an MBMS bearer, wherein the WCD is cognitive regarding a number of radio bearers concurrently active for the WCD (150), and wherein the radio bearers are associated with the EPS bearer;
    the arrangement (600) comprising a controller (620) configured to cause:
        determination whether the number of radio bearers concurrently active for the WCD is at least one of: equal to a threshold value and above the threshold value; and responsive to determination that the number of radio bearers concurrently active for the WCD is at least one of: equal to the threshold value and above the threshold value:
        transmission, towards a control node (300), of a first status message indicative of that the number of radio bearers concurrently active has reached the threshold value.

22. The arrangement according to item 21, wherein the first status message, comprises information regarding the number of radio bearers concurrently active in at least one of: Unacknowledged Mode, UM, and Acknowledged Mode, AM.

23. The arrangement according to any of the items 21-22, wherein the first status message, when received at the control node, is for determination whether the MBMS bearer is to be activated.

24. The arrangement according to any of the items 21-23, wherein the controller is further configured to cause:
    reception, from the control node and in response to transmission of the first status message, of an MBMS service announcement.

25. The arrangement according to item 24, wherein the MBMS service announcement comprises a Temporary Mobile Group Identity, TMGI, identifier.

26. The arrangement according to any of the items 21-25, wherein the controller is further configured to cause:
    reception of communication associated with an active service distributed by the control node over the MBMS bearer and wherein the active service has been transferred, by the control node, from one of the concurrently active radio bearers to the MBMS bearer.

27. The arrangement according to item 26, wherein the controller is further configured to cause:
    determination whether the number of radio bearers concurrently active for the WCD is below the threshold value; and
    responsive to determination that the number of radio bearers concurrently active for the WCD is below the threshold value:
        transmission toward a control node (300), of a second status message indicative of that the number of radio bearers concurrently active has not reached the threshold value.

28. The arrangement according to any of the items 21-27, wherein the threshold value is predefined and equal to one of:
    3 radio bearers in Radio Link Control, RLC, Unacknowledged Mode, UM;
    5 radio bearers in Radio Link Control, RLC, Acknowledged Mode, AM;
    6 radio bearers in Radio Link Control, RLC, Acknowledged Mode, AM; and
    8 radio bearers.

29. A wireless communication device (150) comprising the arrangement of any of the items 21-28.

30. An arrangement (700) for a network communication node (110), for bearer control in a wireless communication system (100), wherein the network communication node is configured for both unicast service, using an Evolved Packet System, EPS, bearer, and multimedia broadcast multicast service, MBMS, using an MBMS bearer, and wherein the network communication node is cognitive regarding a number of radio bearers concurrently active for a wireless communication device, WCD, (150), associated with the network communication node (110), and wherein the radio bearers are associated with the EPS bearer;
    the arrangement (700) comprising a controller (720) configured to cause:
        determination whether the number of radio bearers concurrently active for the WCD is at least one of: equal to a threshold value and above the threshold value; and responsive to determination that the number of radio bearers concurrently active for the WCD is at least one of: equal to the threshold value and above the threshold value:
    transmission, to a control node (300), of a first status message indicative of that the number of radio bearers concurrently active has reached the threshold value.

31. A network communication node (110) comprising the arrangement of item 30.

32. An arrangement (800), for a control node (300), for bearer control in a wireless communication system (100), wherein the control node is configured for control of both unicast service, using an Evolved Packet System, EPS, bearer, and multimedia broadcast multicast service, MBMS, using an MBMS bearer, the arrangement (800) comprising a controller (820) configured to cause:
    reception, from a network communication node (110), of a first status message indicative of that a number of radio bearers concurrently active for a Wireless Communication Device, WCD, associated with the network communication node has reached a threshold value, wherein at least one of the network communication node and the WCD is cognitive regarding the number of radio bearers concurrently active for the WCD, and wherein the radio bearers are associated with the EPS bearer; and
    responsive to the reception of the first status message:
        determination, based on that the number of radio bearers concurrently active for the WCD has reached the threshold value, whether an MBMS bearer is to be activated; and
        responsive to determination that the MBMS bearer is to be activated:
            activation of the MBMS bearer.

33. The arrangement according to item 32, wherein the first status message, comprises information regarding the number of radio bearers concurrently active for the WCD in at least one of: Unacknowledged Mode, UM, and Acknowledged Mode, AM.

34. The arrangement according to any of the items 32-33, wherein the controller is further configured to cause, in response to the determination that the MBMS bearer is to be activated:
    transmission, to the WCD, of an MBMS service announcement.

35. The arrangement according to item 34, wherein the MBMS service announcement comprises a Temporary Mobile Group Identity, TMGI, identifier.

36. The arrangement according to any of the items 33-35, wherein the controller is further configured to cause:
    transfer of an active service from one of the concurrently active radio bearers to the MBMS bearer; and
    in response to the transfer:
        distribution of communication associated with the active service, to the WCD, over the MBMS bearer.

37. The arrangement according to any of the items 32-36, wherein the controller is further configured to cause:
    reception, from the network communication node, of a second status message indicative of that the number of radio bearers concurrently active has not reached the threshold value, wherein at least one of the network communication node and the WCD is cognitive regarding the number of radio bearers concurrently active for the WCD; and
    in response to the reception of the second status message:
        determination (S28), based on the second status message, whether the MBMS bearer is to be de-activated; and
        responsive to determination that the MBMS bearer is to be de-activated:
            de-activation of the MBMS bearer.

38. A control node (300) comprising the arrangement of any of the items 32-37.

39. A wireless communication device, WCD, (600), for bearer control in a wireless communication system (100), wherein the WCD is configured for both unicast service, using a EPS bearer, and multimedia broadcast multicast service, MBMS, using an MBMS bearer, and wherein the WCD is cognitive regarding a number of radio bearers concurrently active for the WCD (150),
the WDC comprising:
    a first determination module (Sx11) configured to determine whether the number of radio bearers concurrently active for the WCD is at least one of: equal to a threshold value and above the threshold value; and
    a first transmission module (Sx12) configured to transmit, when it is determined that the number of radio bearers concurrently active for the WCD is at least one of: equal to the threshold value and above the threshold value, towards a control node (300), a first status message indicative of that the number of radio bearers concurrently active has reached the threshold value.

40. A wireless communication device, WCD, (600), according to item 39, wherein the first status message, comprises information regarding the number of radio bearers concurrently active in at least one of: Unacknowledged Mode, UM, and Acknowledged Mode, AM.

41. A wireless communication device, WCD, (600), according to any of the items 39-40, wherein the first status message, when received at the control node, is for determining whether the MBMS bearer is to be activated.

42. A wireless communication device, WCD, (600), according to any of the items 39-41, further comprising:
    a first reception module (Sx13) configured to receive, from the control node and in response to transmitting the first status message, an MBMS service announcement.

43. A wireless communication device, WCD, (600), according to item 42, wherein the MBMS service announcement comprises a Temporary Mobile Group Identity, TMGI, identifier.

44. A wireless communication device, WCD, (600), according to any of the items 39-43, further comprising:
    a second reception module (Sx14) configured to receive communication associated with an active service distributed by the control node over the MBMS bearer and wherein the active service has been transferred, by the control node, from one of the concurrently active radio bearers to the MBMS bearer.

45. A wireless communication device, WCD, (600), according to item 44, further comprising:
    a second determination module (Sx15) configured to determine whether the number of radio bearers concurrently active for the WCD is below the threshold value; and
    a second transmission module (Sx16) configured to transmit, when it is determined that the number of radio bearers concurrently active for the WCD is below the threshold value, toward a control node (300), a second status message indicative of that the number of radio bearers concurrently active has not reached the threshold value.

46. A wireless communication device, WCD, (600), according to any of the items 39-45, wherein the threshold value is predefined and equal to one of:
   3 radio bearers in Radio Link Control, RLC, Unacknowledged Mode, UM;
   5 radio bearers in Radio Link Control, RLC, Acknowledged Mode, AM;
   6 radio bearers in Radio Link Control, RLC, Acknowledged Mode, AM; and
   8 radio bearers.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

While various aspects and embodiments of the present disclosure have been described above, it should be understood that they have been presented by way of example only, and not limitation. Thus, the breadth and scope of the present disclosure should not be limited by any of the above described exemplary embodiments. Moreover, any combination of the examples and aspects described in this disclosure in all possible variations thereof is encompassed by the disclosure unless otherwise indicated herein or otherwise clearly contradicted by context.

Additionally, while the actions and processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, at a wireless communication device (WCD), for bearer control in a wireless communication system, wherein the WCD is configured for both unicast service using an Evolved Packet System (EPS) bearer, and multimedia broadcast multicast service (MBMS) using an MBMS bearer, wherein the WCD is cognitive regarding a number of radio bearers concurrently active for the WCD, and wherein the radio bearers are associated with the EPS bearer; the method comprising:
   determining whether the number of radio bearers concurrently active for the WCD is equal to a threshold value or above the threshold value; and
   transmitting, towards a control node, when it is determined that the number of radio bearers concurrently active for the WCD is equal to the threshold value or above the threshold value, a first status message indicative of that the number of radio bearers concurrently active has reached the threshold value.

2. The method of claim 1, wherein the first status message comprises information regarding the number of radio bearers concurrently active in Unacknowledged Mode or Acknowledged Mode.

3. The method of claim 1, further comprising receiving, from the control node and in response to transmitting the first status message, an MBMS service announcement.

4. The method of claim 1:
   further comprising receiving communication associated with an active service distributed by the control node over the MBMS bearer; and
   wherein the active service has been transferred, by the control node, from one of the concurrently active radio bearers to the MBMS bearer.

5. The method of claim 4, further comprising:
   determining whether the number of radio bearers concurrently active for the WCD is below the threshold value; and
   transmitting toward a control node, when it is determined that the number of radio bearers concurrently active for the WCD is below the threshold value, a second status message indicative of that the number of radio bearers concurrently active has not reached the threshold value.

6. A method, at a network communication node, for bearer control in a wireless communication system, wherein the network communication node is configured for both unicast service using an Evolved Packet System (EPS) bearer, and multimedia broadcast multicast service (MBMS) using an MBMS bearer, and wherein the network communication node is cognitive regarding a number of radio bearers concurrently active for a wireless communication device (WCD) associated with the network communication node, and wherein the radio bearers are associated with the EPS bearer; the method comprising:
   determining whether the number of radio bearers concurrently active for the WCD is equal to a threshold value or above the threshold value; and
   transmitting to a control node, when it is determined that the number of radio bearers concurrently active for the WCD is equal to the threshold value or above the threshold value, a first status message indicative of that the number of radio bearers concurrently active has reached the threshold value.

7. A method, at a control node, for bearer control in a wireless communication system, wherein the control node is configured for control of both unicast service, using an Evolved Packet System (EPS) bearer, and multimedia broadcast multicast service (MBMS) using an MBMS bearer, the method comprising:
   receiving, from a network communication node, a first status message indicative of that a number of radio bearers concurrently active for a Wireless Communication Device (WCD) associated with the network communication node has reached a threshold value, wherein at least one of the network communication node and the WCD is cognitive regarding the number of radio bearers concurrently active for the WCD, and wherein the radio bearers are associated with the EPS bearer; and
   in response to the reception of the first status message:
      determining, based on that the number of radio bearers concurrently active for the WCD has reached the threshold value, whether an MBMS bearer is to be activated; and
      activating the MBMS bearer when it is determined that the MBMS bearer is to be activated.

8. The method of claim 7, wherein the first status message comprises information regarding the number of radio bearers concurrently active for the WCD in: Unacknowledged Mode or Acknowledged Mode.

9. The method of claim 7, further comprising, in response to determining that the MBMS bearer is to be activated, transmitting an MBMS service announcement to the WCD.

10. The method of claim 7, further comprising:
    transferring an active service from one of the concurrently active radio bearers to the MBMS bearer; and in response to the transfer, distributing communication associated with the active service to the WCD over the MBMS bearer.

11. The method of clam 7, further comprising:
subsequently receiving, from the network communication node, a second status message indicative of that the number of radio bearers concurrently active has not reached the threshold value; and
in response to the reception of the second status message:
determining, based on the second status message, whether the MBMS bearer is to be de-activated; and
de-activating the MBMS bearer when it is determined that the MBMS bearer is to be de-activated.

12. An arrangement for a wireless communication device (WCD), for bearer control in a wireless communication system, wherein the WCD is configured for both unicast service using an Evolved Packet System (EPS) bearer, and multimedia broadcast multicast service (MBMS) using an MBMS bearer, wherein the WCD is cognitive regarding a number of radio bearers concurrently active for the WCD, and wherein the radio bearers are associated with the EPS bearer, the arrangement comprising
processing circuitry;
memory containing instructions executable by the processing circuitry whereby the WCD is operative to:
determine whether the number of radio bearers concurrently active for the WCD is equal to a threshold value or above the threshold value; and
transmit towards a control node, responsive to determining that the number of radio bearers concurrently active for the WCD is equal to the threshold value or above the threshold value, a first status message indicative of that the number of radio bearers concurrently active has reached the threshold value.

13. The arrangement of claim 12, wherein the first status message comprises information regarding the number of radio bearers concurrently active in Unacknowledged Mode or Acknowledged Mode.

14. The arrangement of claim 12, wherein the instructions are such that the WCD is operative to receive, from the control node and in response to transmission of the first status message, an MBMS service announcement.

15. The arrangement of claim 12:
wherein the instructions are such that the WCD is operative to receive communication associated with an active service distributed by the control node over the MBMS bearer; and
wherein the active service has been transferred, by the control node, from one of the concurrently active radio bearers to the MBMS bearer.

16. The arrangement of claim 15, wherein the instructions are such that the WCD is operative to:
determine whether the number of radio bearers concurrently active for the WCD is below the threshold value; and
transmit toward a control node, responsive to determining that the number of radio bearers concurrently active for the WCD is below the threshold value, a second status message indicative of that the number of radio bearers concurrently active has not reached the threshold value.

17. An arrangement for a network communication node, for bearer control in a wireless communication system, wherein the network communication node is configured for both unicast service using an Evolved Packet System (EPS) bearer, and multimedia broadcast multicast service (MBMS) using an MBMS bearer, and wherein the network communication node is cognitive regarding a number of radio bearers concurrently active for a wireless communication device (WCD) associated with the network communication node, and wherein the radio bearers are associated with the EPS bearer; the arrangement comprising:
processing circuitry;
memory containing instructions executable by the processing circuitry whereby the communication node is operative to:
determine whether the number of radio bearers concurrently active for the WCD is equal to a threshold value or above the threshold value; and
transmit to a control node, responsive to determining that the number of radio bearers concurrently active for the WCD is equal to the threshold value or above the threshold value, a first status message indicative of that the number of radio bearers concurrently active has reached the threshold value.

18. An arrangement for a control node, for bearer control in a wireless communication system, wherein the control node is configured for control of both unicast service using an Evolved Packet System (EPS) bearer, and multimedia broadcast multicast service (MBMS) using an MBMS bearer, the arrangement comprising:
processing circuitry;
memory containing instructions executable by the processing circuitry whereby the control node is operative to:
receive, from a network communication node, a first status message indicative of that a number of radio bearers concurrently active for a Wireless Communication Device (WCD) associated with the network communication node has reached a threshold value, wherein at least one of the network communication node and the WCD is cognitive regarding the number of radio bearers concurrently active for the WCD, and wherein the radio bearers are associated with the EPS bearer; and
responsive to the reception of the first status message:
determine, based on that the number of radio bearers concurrently active for the WCD has reached the threshold value, whether an MBMS bearer is to be activated; and
activate the MBMS bearer when it is determined that the MBMS bearer is to be activated.

* * * * *